United States Patent
Rife

(10) Patent No.: US 10,560,361 B2
(45) Date of Patent: Feb. 11, 2020

(54) DISTRIBUTED DATABASE FOR SYNCHRONIZING THE ACCESSIBILITY OF NODES AND SHARED DEVICES

(71) Applicant: WIGWAG, Inc., Austin, TX (US)

(72) Inventor: Jordan Rife, Austin, TX (US)

(73) Assignee: WigWag Inc., Austin, TX (US)

( * ) Notice: Subject to any disclaimer, the term of this patent is extended or adjusted under 35 U.S.C. 154(b) by 250 days.

(21) Appl. No.: 15/403,140

(22) Filed: Jan. 10, 2017

(65) Prior Publication Data

US 2018/0198698 A1 Jul. 12, 2018

(51) Int. Cl.
*H04L 12/26* (2006.01)
*H04L 12/751* (2013.01)

(52) U.S. Cl.
CPC ............ *H04L 43/106* (2013.01); *H04L 45/02* (2013.01)

(58) Field of Classification Search
CPC ............... H04L 12/2803; H04L 43/106; H04L 43/0811; H04L 45/02; H04L 67/1095; H04L 67/12; H04L 67/2861; G06F 16/27; H04W 48/16
See application file for complete search history.

(56) References Cited

U.S. PATENT DOCUMENTS

| 7,127,633 | B1 * | 10/2006 | Olson | G06F 11/2092 714/4.4 |
| 2014/0181521 | A1 * | 6/2014 | Hemphill | H04L 9/0819 713/171 |
| 2018/0276251 | A1 * | 9/2018 | Srinivasan | G06F 16/21 |

OTHER PUBLICATIONS

U.S. Appl. No. 62/397,511, filed Sep. 21, 2016 (Year: 2016).*

* cited by examiner

*Primary Examiner* — June Y Sison
(74) *Attorney, Agent, or Firm* — Berkeley Law & Technology Group, LLP

(57) ABSTRACT

A technique for an access node to synchronize the accessibility of a plurality of access nodes within a network is described. The technique receives an accessibility update and/or device update from a remote node. For the accessibility update, the access node compares entries in the accessibility update to the local accessibility table. If entries in the accessibility update are more up-to-date than the local accessibility table, the access node adjusts the local accessibility table to reflect the updates. The local access node compares the node identifier, heartbeat, and timestamp to determine whether and entry in the local accessibility table is up-to-date. For the device update, the access node compares entries in the device update to the local device table. If entries in the device update are more up-to-date than the local device table, the access node adjusts the local device table to reflect the updates.

22 Claims, 10 Drawing Sheets

DISTRIBUTED DATABASE FOR SYNCHRONIZING THE ACCESSIBILITY OF NODES AND SHARED DEVICES

FIELD

The present disclosure generally relates to a distribution database, and more specifically to a database distributed, eventually consistent that runs alongside a plurality of access nodes.

BACKGROUND

In a data and/or communication network, clients (e.g., devices) may write object values or read current object values in a database to adjust the state of one or more devices (e.g., dim light, set temperature, etc.). For concurrent processes (e.g., writes and reads), a single centralized database at an access node typically ensures that any client (e.g., device) does not read a value from an object that is older (e.g., stale values) than a value that one or more clients (e.g., devices) have already successfully written to the centralized database. Even though this strict consistency of the centralized database ensures data integrity, the centralized access node has scalability restraints. A client's (e.g., device's) physical proximity from the access node, for example, becomes an issue where clients (e.g., devices) that are physically located farther away from central access node have a higher latency than clients (e.g., devices) physically located closer to the central access node. In addition, the clients (e.g., devices) of a centralized database infrastructure rely on the access node to function properly. That is, not only does each client (e.g., device) lose connectivity if/when an access node goes offline (e.g., fail), but some of the clients (e.g., devices) lose proper functionality, as the clients (e.g., devices) cannot read an object or write an object from the centralized database until the access node is brought back online.

One approach to maintain the connectivity and/or functionality of clients (e.g., devices) is to decentralize the database and replicate the database across additional access nodes. This approach has the potential to compensate for offline access nodes and for some clients (e.g., devices) the approach may decrease latency between clients (e.g., devices).

Efforts, however, to ensure that the data is eventually consistent across each access node such that the object values will eventually contain the same value between replicas absent any new writes to an object value to any node, fall short. This shortfall is particularly poignant for access nodes that support internet-of-thing (IoT) devices, which may have multiple communication protocols such as Bluetooth, Zigbee, Z-wave, 6lowPAN, Thread, WiFi, cellular, Nearfield Communication (NFC), Sigfox, Neul, LoRaWAN, to name a few.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its purpose is to present some concepts of one or more examples in a simplified form as a prelude to the more detailed description that is presented below.

In accordance with some embodiments, a method, performed at an access node, for synchronizing accessibility of a plurality of access nodes, the method comprising: receiving an accessibility update from a remote node, wherein the accessibility update comprises a heartbeat for each node identifier; determining whether a node identifier from the accessibility update matches at least one node identifier from an accessibility database, wherein the accessibility database is local to the access node; in accordance with a determination that the node identifier from the accessibility update matches the at least one node identifier from the accessibility database, determining whether a heartbeat associated with the node identifier from the accessibility update is greater than a heartbeat associated with the at least one node identifier from the accessibility database; and in accordance with the determination that the heartbeat associated with the node identifier from the accessibility update is greater than the heartbeat associated with the node identifier from the accessibility database, adjusting the heartbeat associated with the node identifier from the accessibility database.

In accordance with some embodiments, a computer-readable storage medium comprising one or more programs for execution by one or more processors of a network entity, the one or more programs including instructions which, when executed by the one or more processors, cause the electronic device to: receive an accessibility update from a remote node, wherein the accessibility update comprises a heartbeat for each node identifier; determine whether a node identifier from the accessibility update matches at least one node identifier from an accessibility database, wherein the accessibility database is local to the access node; in accordance with a determination that the node identifier from the accessibility update matches the at least one node identifier from the accessibility database, determine whether a heartbeat associated with the node identifier from the accessibility update is greater than a heartbeat associated with the at least one node identifier from the accessibility database; and in accordance with the determination that the heartbeat associated with the node identifier from the accessibility update is greater than the heartbeat associated with the node identifier from the accessibility database, adjust the heartbeat associated with the node identifier from the accessibility database.

In accordance with some embodiments, an electronic apparatus configured to synchronize accessibility of a plurality of access nodes at an access node, comprising: one or more processors; memory; and one or more programs stored in memory, the one or more programs including instructions for: receiving an accessibility update from a remote node, wherein the accessibility update comprises a heartbeat for each node identifier; determining whether a node identifier from the accessibility update matches at least one node identifier from an accessibility database, wherein the accessibility database is local to the access node;

in accordance with a determination that the node identifier from the accessibility update matches the at least one node identifier from the accessibility database, determining whether a heartbeat associated with the node identifier from the accessibility update is greater than a heartbeat associated with the at least one node identifier from the accessibility database; and in accordance with the determination that the heartbeat associated with the node identifier from the accessibility update is greater than the heartbeat associated with the node identifier from the accessibility database, adjusting the heartbeat associated with the node identifier from the accessibility database.

In accordance with some embodiments, an electronic apparatus for synchronizing accessibility of a plurality of access nodes, the apparatus comprising: means for receiving an accessibility update from a remote node, wherein the accessibility update comprises a heartbeat for each node identifier; means for determining whether a node identifier from the accessibility update matches at least one node identifier from an accessibility database, wherein the accessibility database is local to the access node; in accordance with a determination that the node identifier from the accessibility update matches the at least one node identifier from the accessibility database, means for determining whether a heartbeat associated with the node identifier from the accessibility update is greater than a heartbeat associated with the at least one node identifier from the accessibility database; and in accordance with the determination that the heartbeat associated with the node identifier from the accessibility update is greater than the heartbeat associated with the node identifier from the accessibility database, means for adjusting the heartbeat associated with the node identifier from the accessibility database.

DESCRIPTION OF THE FIGURES

For a better understanding of the various described examples, reference should be made to the description below, in conjunction with the following figures in which like reference numerals refer to corresponding parts throughout the figures.

DETAILED DESCRIPTION

Figure 1:
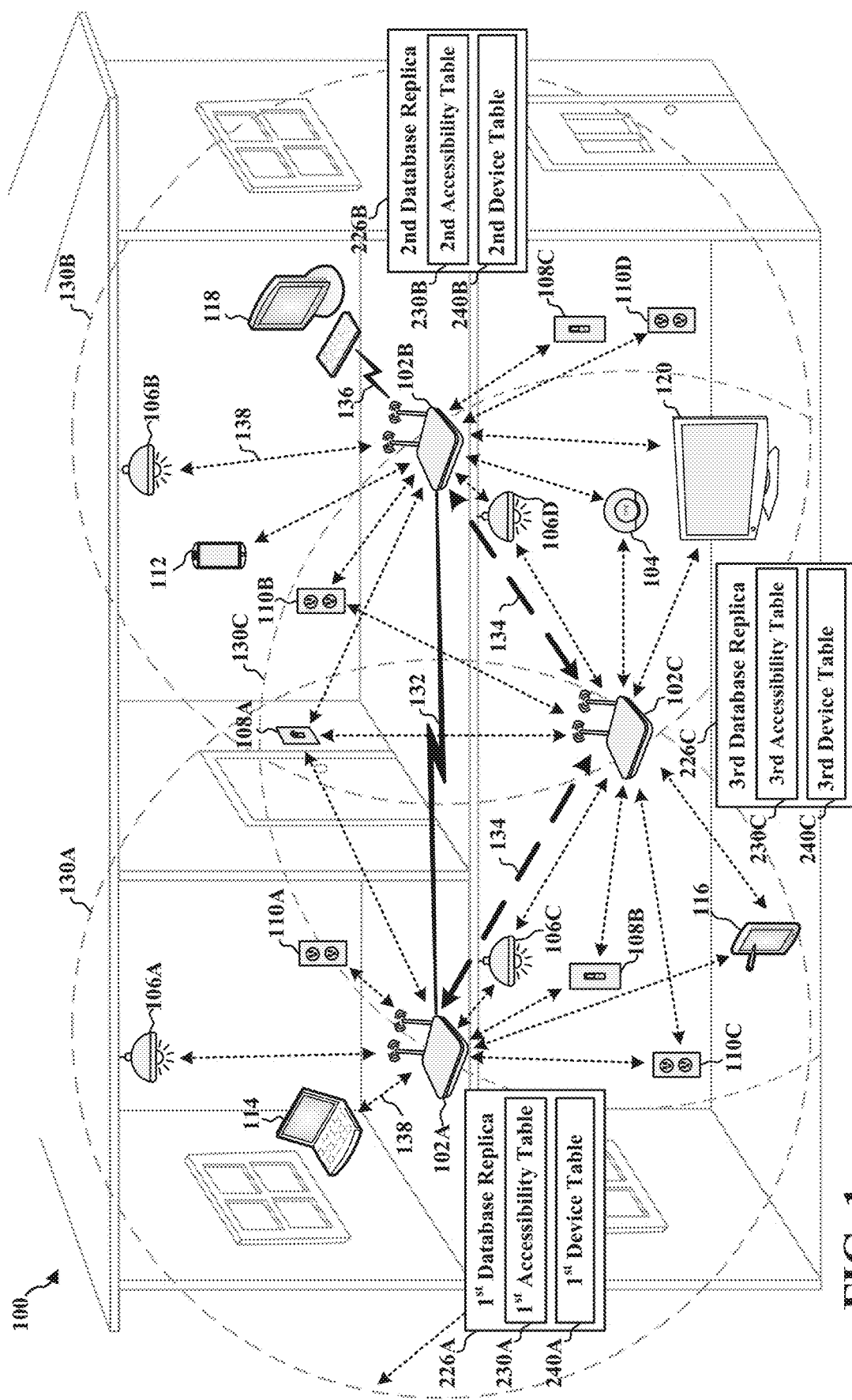
FIG. 1 is a diagram illustrating an example of a data and/or communication network with a distributed database across multiple access nodes.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Examples of distributed database will now be presented with reference to various apparatus and methods. These apparatus and methods will be described in the following detailed description and illustrated in the accompanying drawing by various blocks, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media may include transitory or non-transitory computer storage media for carrying or having computer-executable instructions or data structures stored thereon. Both transitory and non-transitory storage media may be any available media that can be accessed by a computer as part of the processing system. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer. Further, when information is transferred or provided over a network or another communications connection (either hardwired, wireless, or combination thereof) to a computer, the computer or processing system properly determines the connection as a transitory or non-transitory computer-readable medium, depending on the particular medium. Thus, any such connection is properly termed a computer-readable medium. Combinations of the above should also be included within the scope of the computer-readable media. Non-transitory computer-readable media excludes signals per se and the air interface.

With the growth of IoT, a number of standards have evolved in an attempt to provide interoperability between different connected devices. These standards, however, do not offer a consistent programming model for IoT application development and do not necessarily make it easier to create applications for the IoT. Additionally, with no clear frontrunner in the battle for standardization in IoT, many connected devices are not mutually compatible without significant work on the part of a developer. The access node of the present disclosure aims to bridge the gaps between protocols and provide a consistent interface to interact with one or more different connected (IoT) devices across a plurality of access node.

An access node in the present disclosure includes data replication to build scalable applications for the IoT. Each access node includes a database replica with an accessibility table and a device table. The database replica for each node is intended to include the same information that without input (e.g., write requests) from connected devices will eventually converge to the same consistency. Each access node periodically sends accessibility updates and device updates to an accessible remote access nodes. The accessibility updates provide the most up-to-date information of the connected node such as newly registered access nodes and the respective heartbeats of each node. The device updates provide the most up-to-date information for which access node can access with connected devices within the network.

Placing replicas of the accessibility table and the device table in one or more access nodes in a network facilities automatic failover. That is, in the event that communications from an access node is interrupted (e.g., hardware failure, abnormal termination of connection) one or more access nodes already have sufficient information to compensate for the disruption. This configuration further facilitates registering new access nodes since the information for a newly registered access node can be automatically distributed throughout the network.

In addition, one or more access node can optionally include a temporal database that gathers information regarding the status of access nodes and devices throughout the network. Each access node can implement one or more heuristics based on the information gathered from temporal database. These heuristics can dynamically adjust parameters to improve the delivery speed of routing requests.

FIG. 1 is a diagram illustrating an exemplary data and/or communication network 100 with a distributed database across multiple access nodes. The data and/or communication network 100 can be a wide area network (WAN), personal area networks (PANs), local area networks (LANs), campus area networks (CANs), or metropolitan area networks (MANs). The data and/or communication network 100 can include a first access node 102A, a second access node 102B, and third access node 102C, and more access nodes. The network connection between each respective access node can be a physical wire connection 132 or a wireless connection 134, as depicted in FIG. 1.

The access nodes can be a router, gateway, server, and the like. The access nodes utilize a routing protocol that can identify other routers, manage the pathways (e.g., routes) between clients (e.g., devices) and destinations of network messages (e.g., updates, requests, packets), and make dynamic routing decisions. The networking protocol can include higher-level protocols such TCP, UDP, HTTP, HTTPS, FTP, SFTP, etc. and lower-level protocols ARP, ICMP, etc. The protocol can coexist and/or integrate with internet protocol (IP). Wireless protocols can include Bluetooth, Zigbee, Z-wave, 6lowPAN, Thread, WiFi, cellular (3G, 4G, LTE), Nearfield Communication (NFC), Sigfox, Neul, LoRaWAN, etc.

The access node can further include device controllers and applications. The device controllers or the access node refers to circuitry (e.g., hardware components) and appropriate data/communication protocol to interface with a connected client (e.g., device). For example, the device controller for Bluetooth can include the circuitry to communicate at 2.4 GHz by implementing Bluetooth Low-Energy (BLE)—or Bluetooth Smart protocols at 1 Mbps; whereas the device controller for Z-Wave can include the circuitry to communicate at 900 MHz by implementing Z-Wave Alliance ZAD12837/ITU-T G.9959 at 9.6/40/100 kbit/s. In some examples, an access node can have multiple antennas to accommodate the protocols.

Access node applications can adjust parameters to the access node itself and/or send commands to the device controller for controlling a connected client (e.g., device). For example, an application installed on the first access node 102A can provide a graphical user interface (GUI) on laptop 114 (e.g., web-like interface, PHP, html, etc.) that is configured to send commands to the device controller of the first light fixture 106A such as controlling the luminosity of light.

The data and/or communication network 100 can include clients (e.g., devices) that connect to one or more access nodes. Examples, of clients (e.g., devices) are light fixtures, power outlets, light switches, thermostats, smartphones, tablets, computers, laptops, televisions, game consoles, key fobs, electronic sensors, IoT devices, etc. As depicted in FIG. 1, first access node 102A has a wireless range 130A and wirelessly connects to first light fixture 106A, third light fixture 106C, first light switch 108A, second light switch 108B, first power outlet 110A, third power outlet 110C, laptop 114, and tablet 116. The second access node 102B has a wireless range 130B and wirelessly connects to thermostat 104, second light fixture 106B, fourth light fixture 106D, first light switch 108A, third light switch 108C, second power outlet 110B, fourth power outlet 110D, smartphone 112, and television 120. The third access node 102C has a wireless range 130C and wirelessly connects to thermostat 104, third light fixture 106C, fourth light fixture 106D, first light switch 108A, second light switch 108B, second power outlet 110B, third power outlet 110C, tablet 116, and television 120.

Also depicted in FIG. 1, the second access node 102B is connected to computer 118 over wire connection 136. It is contemplated that clients (e.g., devices) can be connected to one or more access nodes over one or both of a wired client connection 136 or wireless client connection 138. As such, one or more clients (e.g., devices) can be connected to an access node over a wire (e.g., Ethernet cable), wirelessly, or both. It is further contemplated that more than one wireless connection can be established between an access node and a single client (e.g., device). For example, in some instances the first light fixture 106A can support Bluetooth and Zigbee. As such, the wireless connection 138 between the first access node 102A and the first light fixture 106A can have both a Bluetooth connection and a Zigbee connection. In such an instance, one of the wireless connections is active with the other inactive. Such a configuration provides optimization and redundancy where the inactive connection can replace the active connection in the event of failure and/or low throughput.

Moreover, each connection protocol between an access node and a client (e.g., device) can be different. For example, the connection between the first access node 102A and the laptop 114 can be a WiFi connection, whereas the connection between the second access node 102B and the smartphone 112 can be a Bluetooth connection. In another example, the connection between the first access node 102A and the first light fixture 106A can be a Bluetooth connection, whereas the connection between the second access node 102B and the second light fixture 106B can be a Zigbee connection. The capability of different connection protocols of like devices can compensate for poor connectivity (e.g., distance variation between like devices) that increase throughput.

Some clients (e.g., devices) include parameters that can be adjusted through a resource controller to modify the state of the client (e.g., device). The resource controllers can register their respective states with the access node server using a unique identifier for that client (e.g., device) along with state properties (e.g., parameters) that tell the access node server what features the client (e.g., device) supports. For example, a light fixture (e.g., 106A, 106B, 106C, 106D) can have an on/off state or a dimness state. In such an instance, the on/off state can be registered with a lightfixtureID (i.e., unique light fixture identifier) with a Boolean value of "1" being "on" and "0" being "off." Likewise, light fixture (e.g., lightfixtureID) can further include dimness state properties such as an unsigned integer value with 256 different dimness settings (e.g., 0 to $2^8$ based on 8 bit register).

At the access node, these state properties (e.g., parameters) provide the capability to categorize clients (e.g., devices) and facilitate applications interaction with a set of clients (e.g., devices) by specifying certain properties (e.g., parameters). As such, access node applications can send commands to resource controllers of clients (e.g., devices) to control the clients (e.g., devices) or to set up subscriptions to listen to events published by one or more clients (e.g., devices).

The access nodes can include a database that is replicated (e.g., 226A, 226B, and 226C) across each connected access node in the data and/or communication network 100. Distributing the database across multiple access node has the potential to compensate for offline access nodes, which can preserve the functionality of some clients (e.g., devices) as well as decrease latency between clients (e.g., devices). As depicted in FIG. 1, the first access node 102A has a first database replica 226A with a first device table 240A and a first accessibility table 230A, the second access node 102B has a second database replica 226B with a second device table 240B and a second accessibility table 230B, the third access node 102C has a third database replica 226C with a third device table 240C and a third accessibility table 230C. It should be appreciated that in instances in time the values in the first database replica 226A, the second database replica 226B, and the third database replica 226C can be different, whereas over time the values in the each respective database will eventually converge to the same consistency barring any new write requests.

The device table (e.g., 240A, 240B, and 240C) identifies the node(s) in which each client (e.g., device) is connected. That is, the device table includes unique entries for each client (e.g., device) data and/or communication network 100. For example, referring to FIG. 1, the first light switch 108A is connected to first access node 102A, the second access node 102B, and the third access node 102C and in some embodiments, is arranged in the device table as "<deviceID of the first light switch 108A>, {<nodeID of the first access node 102A>, <nodeID of the second access node 102B>, <nodeID third access node 102C>}" or "LightSwitch1, {Node1, Node2, Node3}." Similarly, the first power outlet 110A is connected to first access node 102A and third access node 102C and in some embodiments, is arranged in the device table as "<deviceID of the first power outlet 110A>, {<nodeID of the first access node 102A>, <nodeID third access node 102C>}" or "Poweroutlet1, {Node1, Node3}." Similarly, first light fixture 106A is connected only to the first access node 102A and in some embodiments, is arranged in the device table as "<deviceID of the first light fixture 106A>, {<nodeID of the first access node 102A>}" or "LightFixture1, {Node1}."

The accessibility table (e.g., 230A, 230B, and 230C) identifies which access nodes are online and which are access nodes offline. The accessibility table updates a heartbeat and a timestamp for each registered access node in the data and/or communication network 100. In general, the heartbeat is an integer that is independently incremented at each access node when the access node is functioning correctly. As such, an incremented change in the heartbeat indicates that an access point is active and functioning accordingly. In some embodiments, a heartbeat is encoded as an unsigned long integer register (e.g., $2^{32}$ bits) which if incremented every second yields over 136 years before overflow. In some embodiments, a heartbeat is encoded as an unsigned long long integer register (e.g., $2^{64}$ bits) which if incremented every second yields over 584.9 billion years before overflow.

It should be appreciated that the register size of the heartbeat can have other sizes other than 32 bits or 64 bits such as 4 bits, 5 bits, 6 bits, 7, bits, 8 bits, etc. It should further be appreciated that the rate of the heartbeat can vary from access node. For example, some access nodes can increment the heartbeat every second whereas others can increment every femtosecond, picosecond, nanosecond, microsecond, millisecond, tens-of-seconds (e.g., 10 seconds, 15 seconds, 30 seconds, etc.), minute, hour, etc.

The timestamp is an encoded date and time readable to one or more clients (e.g., devices). Examples of time timestamps include "month-day-year@hour:min:sec," "month-day-year@hour:min:sec," "year-dd-month@hour:min:sec," "1234567890 (Unix time)," etc. In general, the timestamp is applied to records and events. For examples. in some embodiments, the timestamp in the accessibility table corresponds to the time the heartbeat was recorded.

Figure 2:
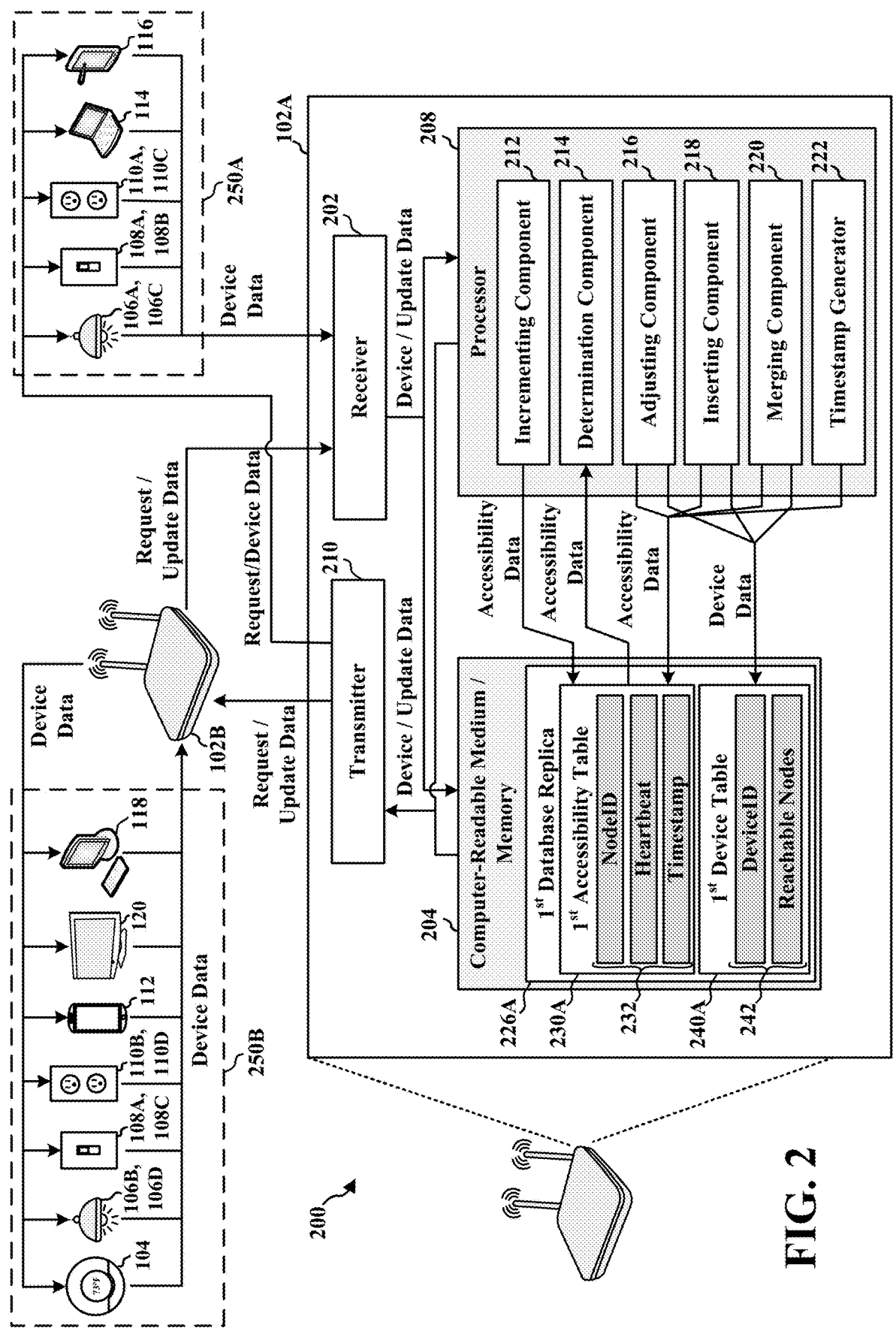
FIG. 2 is a conceptual data flow diagram illustrating the data flow between different means/components at an access node.

FIG. 2 is a conceptual data flow diagram illustrating the data flow between different means/components at an access node. In the examples depicted in FIG. 2, the access node represented by the first access node 102A, is in direct communication with one or more first network devices 250A across a network 200. The network 200 can include both physical wired connections (e.g., Ethernet, Telnet, etc.) and wireless connections (e.g., Bluetooth, Zigbee, Z-wave, 6lowPAN, Thread, WiFi, cellular, Nearfield Communication (NFC), etc.). The first access node 102A is coupled to at least one remote access node, represented by the second access node 102B. The second access node 102B is in direct communication with one or more second network devices 250B across the network 200. In some embodiments, one or more network devices can be in direct communication with both the first network devices 250A and second network devices 250B. For example, the first light switch 108A is in both the first network devices 250A and the second network devices 250B. It should be appreciated that additional access nodes can connect to the first access node 102A and that each additional access node can include additional network devices.

As depicted in FIG. 2, the first access node 102A includes a computer-readable medium/memory 204, one or more processors 208, a transmitter 210, and a receiver 202. The transmitter 210 is configured to transmit requests, as well as update data to the second access node 102B. The transmitter 210 also configured to transmit requests and device data to the first network devices 250A. The requests can be instructions and/or parameters to that cause the first network devices 250A to change state. For example, a request can be instruction for the first light switch 108A to turn on a light fixture. The updates can be accessibility updates or device updates. In addition, the transmitter 210 is configured to receive information from the first access node 102A, specifically the first database replica 226A of the computer-readable medium/memory 204 or processor 208, and based on the received information, generate a signal to be applied to the one or more antennas and/or transmission lines. In some embodiments, the transmitter 210 includes circuitry that supports multiple communication protocols such as Bluetooth, Zigbee, Z-wave, 6lowPAN, Thread, WiFi, cellular, Nearfield Communication (NFC). In such embodiments, the transmitter 210 can connect to a plurality of antennas.

The receiver 202 is configured to receive requests, as well as update data from the second access node 102B. In the example depicted FIG. 2, the receiver 202 receives requests as well as device data from the first network devices 250A. The receiver 202 is further configured to forward (e.g., transmit) the requests to processor 208 and/or to the computer-readable medium/memory 204. In some embodiments, the receiver 202 includes circuitry that supports multiple communication protocols such as Bluetooth, Zigbee, Z-wave, 6lowPAN, Thread, WiFi, cellular, Nearfield Communication (NFC). In such embodiments, the receiver 202 can connect to a plurality of antennas. In some instances, the transmitter 210 and receiver 202 function to relay requests from a first remote access node to a second remote access node.

The computer-readable medium/memory 204 includes the first database replica 226A, which is part of a distributed database across access nodes (e.g., second access node 102B, etc.). The first database replica 226A includes a first accessibility table 230A and a first device table 240A. The first accessibility table 240A includes three columns with accessibility headers 232 that designate a node identifier (e.g., nodeID), a heartbeat, and a timestamp. The first accessibility table 230A is configured to receive accessibility data, specifically an increment to the heartbeat of the first access node 102A, from the incrementing component 212. The first accessibility table 230A is also configured to receive accessibility data from an adjusting component 216, an inserting component 218, a merging component 220, and a timestamp generator 222.

The adjusting component 216 is configured to adjust the values of the node identifier (e.g., nodeID), the heartbeat, or the timestamp in existing entries of the first accessibility table 230A. For example, the adjusting component 216 can adjust the heartbeat associated with the node identifier from the accessibility database. The inserting component 218 is configured to insert a new row (e.g., entry) in to the first accessibility table 230A. For example, the inserting component 218 can insert the node identifier and the heartbeat associated with the node identifier from the accessibility update into the accessibility database. The inserting component 218 can also insert the local timestamp into the accessibility database to reflect the adjustment of the heartbeat associated with the node identifier. The merging component 218 configured to merge values of the node identifier (e.g., nodeID), the heartbeat, or the timestamp in existing entries of the first accessibility table 230A. The merging component 218 can merge a set of node identifiers associated with the device identifier from the device update into the set of node identifiers associated with the at least one device identifier from a device database. The timestamp generator 222 is configured to generate a new timestamp from an internal clock or networked chronometer (e.g., internet time).

The first accessibility table 230A also provides accessibility data to a determination component 214, which compares one or more entries of the first accessibility table 230A. The determination component 214 can determine whether a node identifier from an accessibility update matches at least one node identifier from an accessibility database. The determination component 214 can determine whether a heartbeat associated with the node identifier from the accessibility update is greater than a heartbeat associated with the at least one node identifier from the accessibility database. The determination component 214 can determine whether a time difference from a last action associated with the node identifier exceeds a threshold value. The determination component 214 can determine whether an inaccessibility indicator is associated with the node identifier from the accessibility database. The determination component 214 can determine whether an inaccessibility indicator is associated with the node identifier from the accessibility database. The determination component 214 can determine whether the set of node identifiers associated with the device identifier from the device update has non-intersecting devices to a set of node identifiers associated with the at least one device identifier from a device database.

The first device table 240A includes two columns with device headers for a device identifier (e.g., deviceID) and a set of node identifiers corresponding to a set of access nodes that are in direct connection with the first access node 102A. The first device table 240A is configured to receive device data from the adjusting component 216, the inserting component 218 and the merging component 220. The merging component 220 can merge the set of node identifiers associated with the device identifier from the device update into the set of node identifiers associated with the at least one device identifier from a device database.

Figure 3:
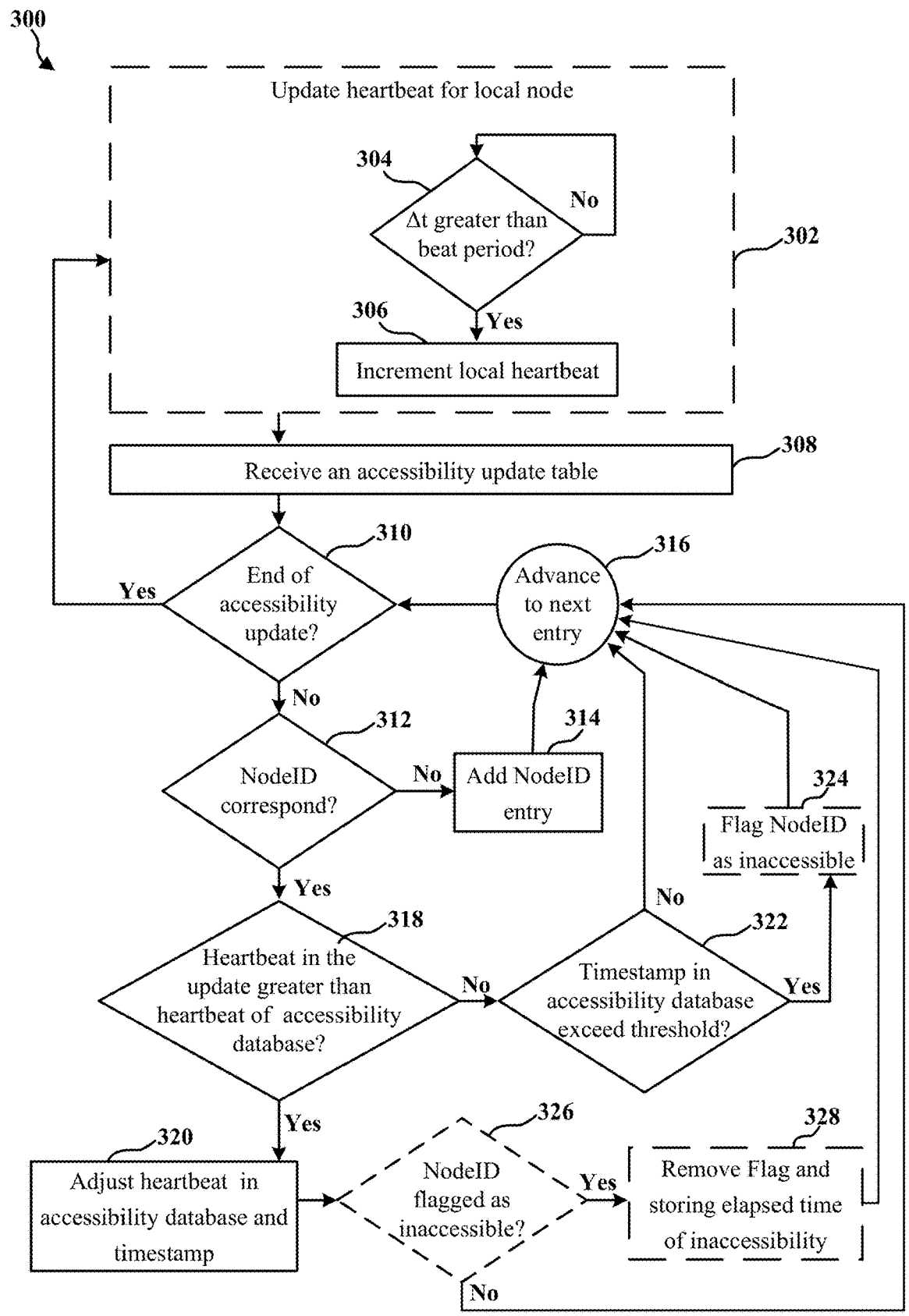
FIG. 3 illustrates an exemplary process for synchronizing an accessibility table to a database at an access node from an accessibility update.

FIG. 3 illustrates an exemplary process 300 for synchronizing an accessibility table to a database at an access node from an accessibility update. Process 300 can be performed when an access node receives an update from another access node. The process 300 can be performed by a local access node (e.g., first access node 102A, second access node 102B, third access node 102C, etc.). In some embodiments, the local access node is a router. In some embodiments, the local access node is a network switch. In some embodiments, the local access node is a server.

At block 302, a local node can optionally update the heartbeat (counter) for the local access node. In general, each node is configured to increment, at regular intervals (e.g., beat period), a local heartbeat counter. An incremented change in the heartbeat (counter) at a local node indicates that the local node is active and functioning correctly. The (heartbeat) register can be a 32 bit register that increments unsigned long integer register (e.g., 232 bits), which if incremented every second yields over 136 years. In some embodiments, the (heartbeat) register can be a 64 bit register an unsigned long long integer register (e.g., 264 bits), which if incremented every second yields over 584.9 billion years. It should be appreciated, that the time period between each heartbeat (e.g., Δt or pulse rate) can be more or less than one second. For example, in some examples the pulse rate can be microseconds (1-999 μs), milliseconds (1-999 ms), seconds (1-9 s), tens-of-seconds (10-59 s), minutes (1-59 min), hours (1-23.999 hrs), and the like. In some embodiments, the pulse rate is a configurable register where a user can select an appropriate pulse rate.

At block 304, to update the heartbeat register (counter) for the local access node, the local access node determines whether the time period from the last heartbeat (e.g., Δt or pulse rate) exceeded a beat period. If the local access node determines that the time period from the last heartbeat (e.g., Δt or pulse rate) does not exceeded the beat period the heartbeat (counter) is not incremented. If the local access node determines that the time period from the last heartbeat (e.g., Δt or pulse rate) has exceeded the beat period, the heartbeat (counter) is incremented, as designated at block 306. In some embodiments, the first access node 102A includes circuitry for the heartbeat to be designated with a periodic pulse (e.g., square pulse) that has a rising edge or falling edge transition at the pulse rate (e.g., Δt). In such an instance, the heartbeat register can be configured to increment at a rising edge or falling edge transition.

At block 308, a local access node receives an update from a remote access node. In some instances, the update is an accessibility update, which includes an accessibility update table. In some embodiments, the accessibility update table mirrors the accessibility table of the database replica of the remote access node. For example, the first access node 102A can receive an accessibility update from second access node 102B that is a copy of the accessibility table 230B (e.g., accessibility update has entries for each node identifier in the accessibility table 230B). In some embodiments, the accessibility update table provides changes to the accessibility table, which correspond to the entries of the accessibility database replica of the remote access node that have changed since a previous update. For example, the first access node 102A can receive an accessibility update from second access node 102B that provides an accessibility update table with entries corresponding to a change in state for each node identifier in the second accessibility table 230B of the second database replica 226B of the second access node 102B.

An example of an entry in the accessibility update table is "102B; 86; 1477423525232," which represents a second access node "102B" with a heartbeat changed to 86 at timestamp 1477423525232. Another example of an entry in the accessibility update table is "102B; 86," which represents a second access node "102B" with a heartbeat of 86. It should be appreciated that in some embodiments, the timestamp is left off of the accessibility update table, since the timestamp can be applied to the accessibility table of the database replica by the local access node. In such instances, the timestamps of the entries in the accessibility table correspond to local changes to the database. As such the timestamps of the database replica will be different for the replica of each access node.

At block 310, process 300 determines whether the current entry of the accessibility update table is at the end of accessibility update table. In general, the local access node inspects the accessibility update table entry by entry. As such, an end of file (eof) indicates to the local node access in process 300 that the synchronization from the update is complete. For example, in some instances an eof is returned when process 300 advances from the last entry of the accessibility update table. In some embodiments, the eof triggers the local access node to return to state prior to receiving an accessibility update (e.g., block 302).

At block 312, process 300 determines whether a node identifier (e.g., nodeID) of the current entry in the accessibility update table corresponds with a node identifier (e.g., nodeID) of the accessibility table of the database replica of the local node. For example, in reading entry "102B; 86; 1477423525232" from an accessibility update table from the second access node 102B, the process 300 executed at first access node 102A queries the first accessibility table 230A of the database replica 226A for node identifier (e.g., nodeID) "102B" for comparison.

At block 314, process 300 adds a node identifier (e.g., nodeID) to the database replica in accordance with a determination that the node identifier (e.g., nodeID) of the current entry in the accessibility update table does not corresponds with any node identifier (e.g., nodeID) of the accessibility table of the database replica. For example, if in querying the first accessibility table 230A of the database replica 226A for node identifier (e.g., nodeID) "102B" from an entry "102B; 86; 1477423525232" of the update, no entry for "102B" is found, the access node 102A adds a new entry for node identifier (e.g., nodeID) "102B" in the first accessibility table 230A of the database replica 226A for node identifier. Further, the process 300 executed at first access node 102A allocates sufficient space in the first accessibility table 230A for the heartbeat and the timestamp. In some embodiments, the heartbeat value is stored in allocated memory when a new entry for node identifier is allocated and/or stored. In some embodiments, the timestamp value is stored in allocated memory when a new entry for node identifier is allocated and/or stored. Once the node identifier (e.g., nodeID) has been added to the database replica, process 300 advances to the next entry in the accessibility update table, as designated at block 316.

At block 318, process 300 determines whether a heartbeat in the accessibility update exceeds (e.g., is greater than) the heartbeat of the corresponding entry in the accessibility table of the database replica. A larger heartbeat in the accessibility update table than the accessibility table indicates that the access node corresponding to the entry node identifier is still active (e.g., has a pulse) and is functioning correctly. A smaller heartbeat in the accessibility update table than the accessibility table indicates that the entry in the remote access node should be updated. In some embodiments, a smaller heartbeat triggers the local access node to generate a second accessibility update to be received by the remote access node. This local access node inserts the node identifier and heartbeat from the accessibility database and transmits the second accessibility update to the remote node. An equal heartbeat in the accessibility update table compared to the accessibility table indicates that either the access node associated with the node identifier is inaccessible or the access node associated with the node identifier has not incremented its heartbeat.

At block 320, process 300 adjusts the heartbeat and the timestamp of the accessibility database replica, in accordance with a determination that heartbeat in the accessibility update exceeds (e.g., is greater than) the heartbeat of the corresponding entry in the accessibility database replica. The local access node replaces the heartbeat of the corresponding entry of the accessibility database replica with the more recent heartbeat provided in the accessibility update. In addition, the local access node generates a new timestamp (e.g., from the local timestamp generator) to replace the timestamp of the corresponding entry of the accessibility database replica. In some embodiments, the local access node replaces the timestamp of the corresponding entry of the accessibility database replica with a more recent timestamp provided in the accessibility update, which corresponds to the time the heartbeat was updated for the access node corresponding to the entry node identifier.

At block 322, process 300 determines whether the timestamp in the accessibility table exceeds a threshold value, in accordance with a determination that the heartbeat in the accessibility update is equal to the heartbeat of the corresponding entry in the accessibility database replica. A timestamp comparison can indicate inaccessibility for non-changing heartbeats. That is, in some instances, an access node can become inaccessible from connection disruption or a malfunction at the access node itself. In such an instance, the heartbeat of the node will not increase over time. As such, an access node is considered inaccessible when the heartbeat has not changed for a predetermined amount of time (e.g., threshold value). In some embodiments, a threshold value corresponding to the predetermined amount of time can be weighted based on an aggregation of elapsed time from timestamp in the accessibility table. In such an instance, the threshold value indicates an amount of time an access node can be idle before the access node is considered inaccessible.

In accordance with a determination that the timestamp (e.g., elapsed time from current time) in the accessibility table does not exceed a threshold value, the access node associated with the node identifier is considered to be accessible. For example, if the time stamp of the present time at first access node 102A is "1477423525458" and the threshold is set to "1477423525832" (e.g., 10 minutes after the timestamp of the entry of the node identifier of "1477423525232") corresponding to access node 102B, then the access node 102B is still considered active and alive. In such an event, process 300 of local access node advances to the next entry, as designated at block 316.

In accordance with a determination that the timestamp (e.g., elapsed time from current time) in the accessibility table exceeds a threshold value, the access node associated with the node identifier is considered to be inaccessible. For example, if the time stamp of the present time at first access node 102A is "1477423525858" and the threshold is set to "1477423525832" (e.g., 10 minutes after the timestamp of the entry of the node identifier of "1477423525232") corresponding to access node 102B, then the access node 102B is considered inaccessible. In such an event, process 300 of local access node optionally inserts an inaccessibility indicator (e.g., inaccessible flag) associated with the node identifier from the accessibility database, as designated at block 324.

In some embodiments, the inaccessibility indicator is provided in alongside the node identifier, heartbeat, and stamp. For example, an entry in the accessibility table can read "102B; 86; 1477423525232, 0" which represents a second access node "102B" with a heartbeat at 86, a timestamp 1477423525232, and is currently inaccessible (e.g., 0 indicates inaccessible, 1 indicates accessible). In general, the inaccessibility indicator is a local feature and each access node can designate (e.g., heuristically or manually) a threshold value that when exceeded generates the inaccessibility indicator. As such, the inaccessibility indicator can be but is usually not provided in updates. In some embodiments, the inaccessibility indicator has a range. For example, the inaccessibility indicator can range from 0 to 99, with 99 being the highest accessibility and 0 being the lowest. As such, the accessibility can be ranked, which techniques can utilize to find routes to devices with the lowest latency.

At optional block 326, process 300 determines whether an inaccessibility indicator (e.g., inaccessible flag) is associated with the node identifier from the accessibility database. In accordance with a determination that an inaccessibility indicator (e.g., inaccessible flag) is not associated with the node identifier, process 300 of local access node advances to the next entry, as designated at block 316. In this instance, the access node associated with the node identifier remains accessible.

At optional block 326, in accordance with a determination that an inaccessibility indicator (e.g., inaccessible flag) is associated with the node identifier, process 300 of local access node removes the inaccessibility indicator (e.g., inaccessible flag), calculates an elapsed time of inaccessibility of the local access node associated with the node identifier from the accessibility database; and stores the elapsed time of inaccessibility to a temporal database (e.g., duration of inaccessibility database) for future use (e.g., heuristics). In some embodiments, removing the inaccessibility indicator is changing an entry in the accessibility table from "0" to "1" (e.g., 0 indicates inaccessible, 1 indicates accessible). In some embodiments, removing the inaccessibility indicator is changing from a highest values corresponding to inaccessible (e.g., 99) to a weighted average value (e.g., 50) corresponding a degree of accessibility over a predetermined amount of time. For example, the weighted average can be normalized by dividing the duration time of accessibility over a predetermined amount of time. In some instances, the weighted average value can be an exponential average that gives more weight to more recent accessibility over a predetermined amount of time.

Figure 4:
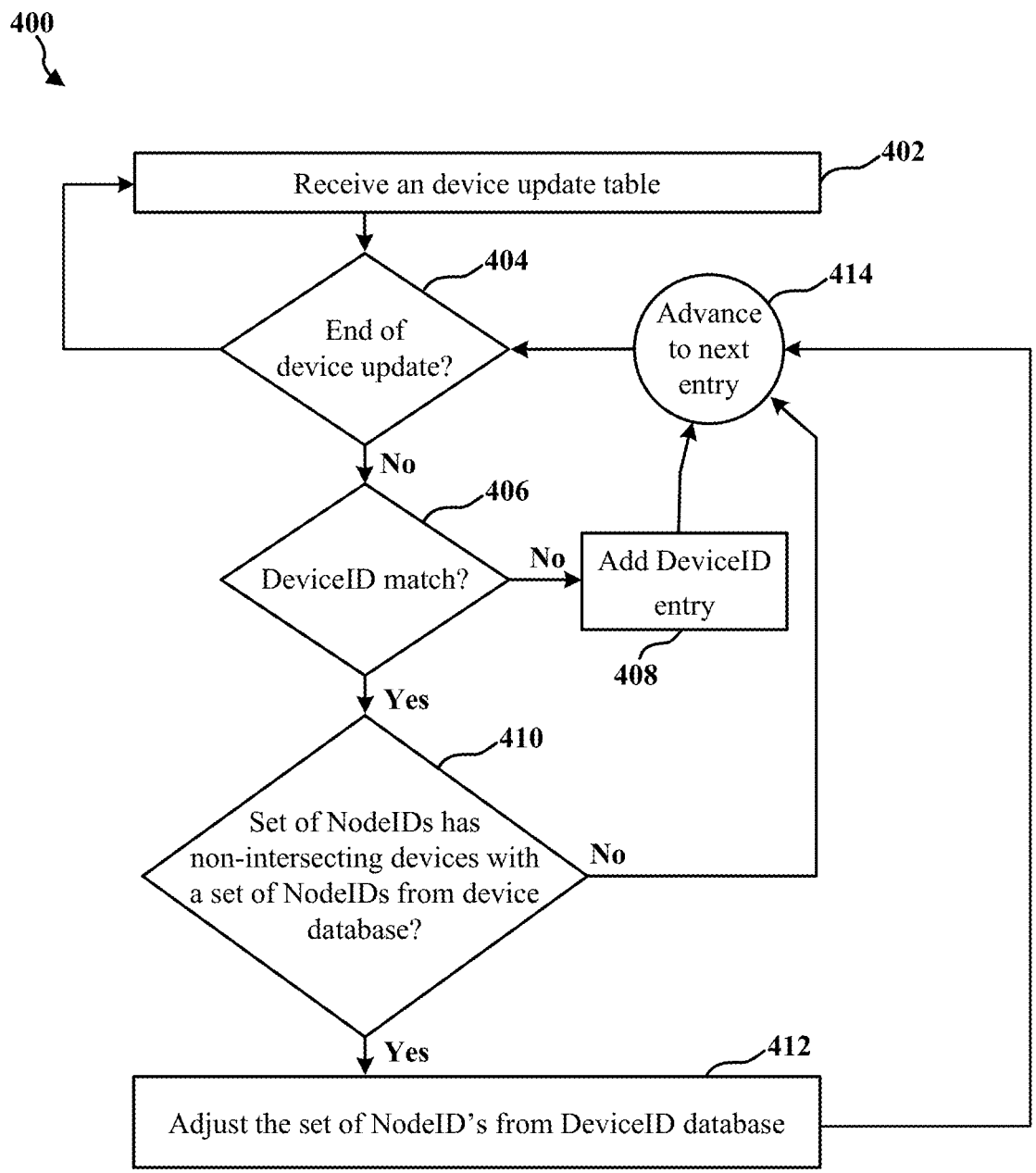
FIG. 4 illustrates an exemplary process for synchronizing a device table to a database at an access node from a device update.

FIG. 4 illustrates an exemplary process 400 for synchronizing a device table to a database at an access node from a device update. Process 400 can be performed when an access node receives an update from a remote access node. The process 400 can be performed by a local access node (e.g., first access node 102A, second access node 102B, third access node 102C, etc.). In some embodiments, the local access node is a router. In some embodiments, the local access node is a network switch. In some embodiments, the local access node is a server.

At block 402, a local access node receives an update from a remote access node. In some instances, the update is a device update, which includes a device update table. In some embodiments, the device update table mirrors the device table of the database replica of the remote access node. For example, the first access node 102A can receive a device update from second access node 102B that is a copy of the device table 240B (e.g., device update has entries for each node identifier in the device table 240B). In some embodiments, the device update table provides changes to the device table, which correspond to the entries of the device database replica of the remote access node that have changed since a previous update. For example, the first access node 102A can receive a device update from second access node 102B that provides a device update table with entries that represent a change in state for each node identifier in the second device table 240B of the second database replica 226B of the second access node 102B.

An example of an entry in the device update table is "108A;{120A, 102B, 102C}," which represents light switch 108A device connected to the first access node "102A," the second access node "102B," and the third access node "102C." Another example of an entry in the device update table is "104; (102B, 102C), 1477423525232," which represents the thermostat 104 connected to the second access node "102B" and the third access node "102C."

At block 404, process 400 determines whether the current entry of the device update table is at the end of device update table. In general, the local access node inspects the device update table entry by entry. As such, an eof indicates to the local node access in process 400 that the synchronization from the update is complete. For example, in some instances an eof is returned when process 400 advances from the last entry of the device update table. In some embodiments, the eof triggers the local access node to return to state at or prior to receiving a device update (e.g., block 402).

At block 406, process 300 determines whether a device identifier (e.g., deviceID) of the current entry in the device update table corresponds with a device identifier (e.g., deviceID) of the device table of the database replica of the local node. For example, in reading entry "108A; {120A, 102B, 102C}" from a device update table from the second access node 102B, the process 400 when executed at first access node 102A queries the first device table 240A of the database replica 226A for device identifier (e.g., deviceID) "108A" for comparison.

At block 408, process 400 adds a device identifier (e.g., deviceID) to the database replica in accordance with a determination that the device identifier (e.g., deviceID) of the current entry in the device update table does not corresponds with any device identifier (e.g., deviceID) of the device table of the database replica. For example, if in querying the first device table 240A of the database replica 226A for device identifier (e.g., deviceID) "108A" from an entry "108A; {120A, 102B, 102C}" of the update, no entry for "108A" is found, the access node 102A adds a new entry for device identifier (e.g., deviceID) "108A" in the first device table 240A of the database replica 226A for node identifier. Further, the process 400 when executed at first access node 102A allocates sufficient space in the first device table 240A for a set of node identifiers (e.g., nodeIDs). In some embodiments, the node identifier (e.g., nodeID) value is stored in allocated memory when a new entry for device identifier is allocated and/or stored. Once the device identifier (e.g., deviceID) has been added to the database replica, process 400 advances to the next entry in the accessibility update table, as designated at block 414.

At block 410, process 400 determines whether a set of node identifiers (e.g., nodeIDs) in the device update has non-intersecting devices with a set of node identifiers (e.g., nodeIDs) from device database 226. Non-intersecting devices between the device update and the device table indicates that the device includes one or more connections to one or more access nodes for either the access node receiving the update or for the access node that sent the update. For example, an entry "108A; {120A, 102B, 102C}" of the device update table sent from the second access node 102B to the first access node 102A, where the corresponding entry in the first device table 240A of the first database 226A is "108A; {102B, 102C}," process 400 determines that a first access node 102A is missing from the first device table 240A of the first database 226A. Conversely, an entry "108A; {102B, 102C}" of the device update table sent from the second access node 102B to the first access node 102A, where the corresponding entry in the first device table 240A of the first database 226A is "108A;{120A, 102B, 102C}," process 400 determines that a first access node 102A is missing from the second device table 240B of the second database 226B as indicated by the update.

At block 412, process 400 adjusts the set of node identifiers (e.g., nodeIDs) of the device database replica, in accordance with a determination that the set of node identifiers (e.g., nodeIDs) in the device update has non-intersecting devices with a set of node identifiers (e.g., nodeIDs) from device database. If the non-intersecting devices correspond to devices missing from the local device table of the local database that received the update, the local access node includes the missing non-intersecting devices of the corresponding entry to the local device table database. For example, an entry "108A; {120A, 102B, 102C}" of the device update table sent from the second access node 102B to the first access node 102A, where the corresponding entry in the first device table 240A of the first database 226A is "108A;{102B, 102C}," process 400 can include first access node 102A into the set of devices of the first device table 240A of the first database 226A for that entry. It should be appreciated that in some embodiments, the added non-intersecting devices can be added to the front of the set, (e.g., "{102A, 102B, 102C}," back of the set "{102B, 102C, 102A}," or ordered according to an alpha numeric order schema (e.g., 102C>102B>102A which corresponds to {102C, 102B, 102A}).

If the non-intersecting devices correspond to devices missing from the device update table corresponding to the device table of the access node that sent the update, the local access node can trigger an "reply" device update to be sent back to the access node that sent the update in order to update non-intersecting devices in the device update table of the device table database for the access node that sent the update. For example, an entry "108A; {102B, 102C}" of the device update table sent from the second access node 102B to the first access node 102A, where the corresponding entry in the first device table 240A of the first database 226A is "108A; {120A, 102B, 102C}," process 400 triggers a "reply" device update to be sent from first access node 102A to the second access node 102B with the entry "108A; {120A, 102B, 102C}."

Figure 5:
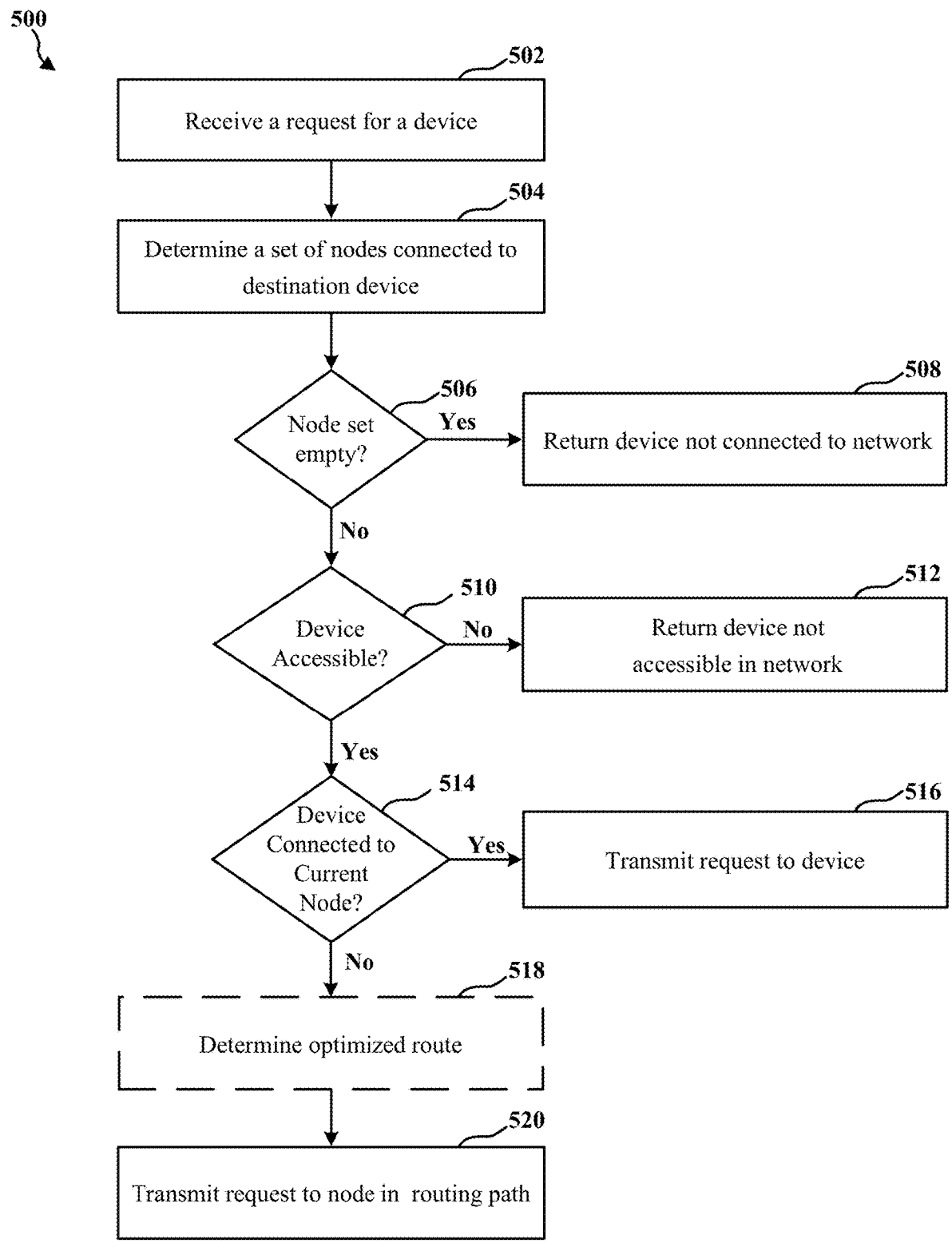
FIG. 5 illustrates an exemplary process for processing a request for a device at an access node.

FIG. 5 illustrates an exemplary process 500 for processing a request for a device at an access node. Process 500 can be performed when an access node receives request from a device or another access node. The process 500 can be performed by a local access node (e.g., first access node 102A, second access node 102B, third access node 102C, etc.).

At block 502, process 500, which when executed at a local access node (e.g., first access node 102A, second access node 102B, third access node 102C, etc.) receives a request for a device. In some embodiments, a first device (e.g., mobile device 112, laptop 114, computer 118, etc.) requests a change in state for a second device (e.g., light switch 108A, thermostat 104, etc.). For example, a user interface on laptop 114 forwards (e.g., transmits) a request to first access node 102A to set a desired temperature of thermostat 104, which adjusts the temperature in a building. In turn the mobile device 112 forwards (e.g., transmits) a request that is sent directly or relayed to thermostat 104 to change the temperature.

It should be appreciated that in some embodiments, a first device (e.g., mobile device 112) requests a change in state for an access node (e.g., first access node 102A, second access node 102B, third access node 102C, etc.). For example, a user interface on mobile device 112 can grant permission for one or more devices. That is, mobile device 112 forwards (e.g., transmits) a request to first access node 102A to add light switch 108B to a group of light switches (e.g., 108A, 108C). In some embodiments, an access node (e.g., first access node 102A, second access node 102B, third access node 102C, etc.) requests a change in state for a first device (e.g., mobile device 112). For example, first access node 102A forwards (e.g., transmits) a request an update request to second access node 102B.

At block 504, process 500 determines a set of nodes connected to a destination device. For example, upon receiving the request from laptop 114 to set a desired temperature of thermostat 104, the first access node 102A accesses the first device database table of the first database replica 226A and queries for device 104 (e.g., thermostat 104). Referring to FIG. 1, thermostat 104 is connected directly to the second access node 102B and the third access node 102C. As such, the query from process 500 returns "{102B, 102C}" as the set of node in the first device table 240A.

At block 506, process 500 determines whether the returned set is an empty set. That is, in some instances, the device table 240A may not have a set of node identifiers (e.g., nodeID) be updated. Examples include instances when a device has been newly registered and the database has not had sufficient time to determine/update the device table of one or more replicas. In such an instance, a query for a set of connected node in the device table can return an empty set.

At block 508, the process 500 returns that the device is not connected to the network in accordance with a determination that that query is an empty set. That is, an empty set indicates to a local node that there is no access nodes connected to the device.

At block 510, the process 500 determines whether the device is accessible in accordance with a determination that that query returns a set of node identifiers (e.g., query is not an empty set). For example, a query for the first light switch 108A to the first device database table 240A returns a set of nodes "{102A, 102B, 102C}," which include the first access node 102A. As such, the local node concludes that the first light switch 108A is accessible from the first access node 102A. In another example, a query for the thermostat 104 to the first device database table 240A returns a set of nodes "{102B, 102C}," which indicates that the thermostat 104 is accessible from the second access node 102B and the third access node 102C. Thus, process 500 determines that the thermostat 104 is not directly connected to the current node and should relay the request through another access node.

In some embodiments, process 500 queries the access node in the device database to determine connection between adjacent access nodes. For example, a query for the thermostat 104 to the first device database table 240A returns a set of nodes "{102B, 102C}. Since the query does not include the first access node 102A, process 500 can query for the first access node 102A in the first device database table 240A, which returns to the set of nodes "{102A, 102B, 102C}. As such, the thermostat 104 is accessible by having the first access node 102A relay the request to either the second access node 102B or the third access node 102C.

At block 514, the process 500 determines whether the device is connected directly to the current node in accordance with a determination that that the device is accessible. For example, a query for the first light switch 108A to the first device database table 240A returns a set of nodes "{102A, 102B, 102C}," which include the first access node 102A. As such, process 500 determines that the first light switch 108A is directly connected to the current node, which is the first access node 102A. In such an instance, the process 500 transmits the request directly to the device as indicated at block 516, which in this instance the first access node 102A transmits the request directly to the first light switch 108A.

At block 518, the process 500 determines the optimized route in accordance with a determination that the device is connected directly to the current node. For example, a query for the thermostat 104 to the first device database table 240A returns a set of nodes "{102B, 102C} and a query for the first access node 102A in the first device database table 240A, returns to the set of nodes "{102A, 102B, 102C}. Further, the process 500 can access the elapsed time of inaccessibility or accessibility ranking at a temporal database, which can indicate that one or more of the devices and/or access node is faster and/or more responsive. In turn, the process 500 determines that relaying the request to the highest ranked accessible node with respect to the current local node optimizes the throughput (e.g., delivery request speed). In some examples, the accessibility rank from the temporal database at the first access node 102A can rank the second access node 102B higher than the third access node 102C. In such instances, the process 500 would determine the shortest routing pass is through the second access node 102B and transmit the request to node 102B, as identified in block 520.

At block 520, the process 500 transmits the request to the next access node in the routing path. In some examples, there is only one routing path. In some examples, when more than one routing paths are possible, the process 500 can route the request to the highest ranked accessible node with respect to the current local node (e.g., delivery request speed). In some examples, when more than one routing paths are possible, the process 500 can route the request to overcome a failover situation. For example, a query for the thermostat 104 to the first device database table 240A returns a set of nodes "{102B, 102C} and a query for the first access node 102A in the first device database table 240A, returns to the set of nodes "{102A, 102B, 102C}. Further, the timestamp from the first accessibility table 230A indicates that the elapsed time for the second access node 102B exceeds a threshold value, which indicates an inaccessible (e.g., unresponsive) access node. As such, the first access node 102A relays the request to the third access node 102C. It should be appreciated that timing for failover overrides ranking. That is, in the above the example, the first access node 102A would relay the request to the third access node 102C when the second access node 102B timed out even if the second access node 102B has a higher ranking.

Figure 6:
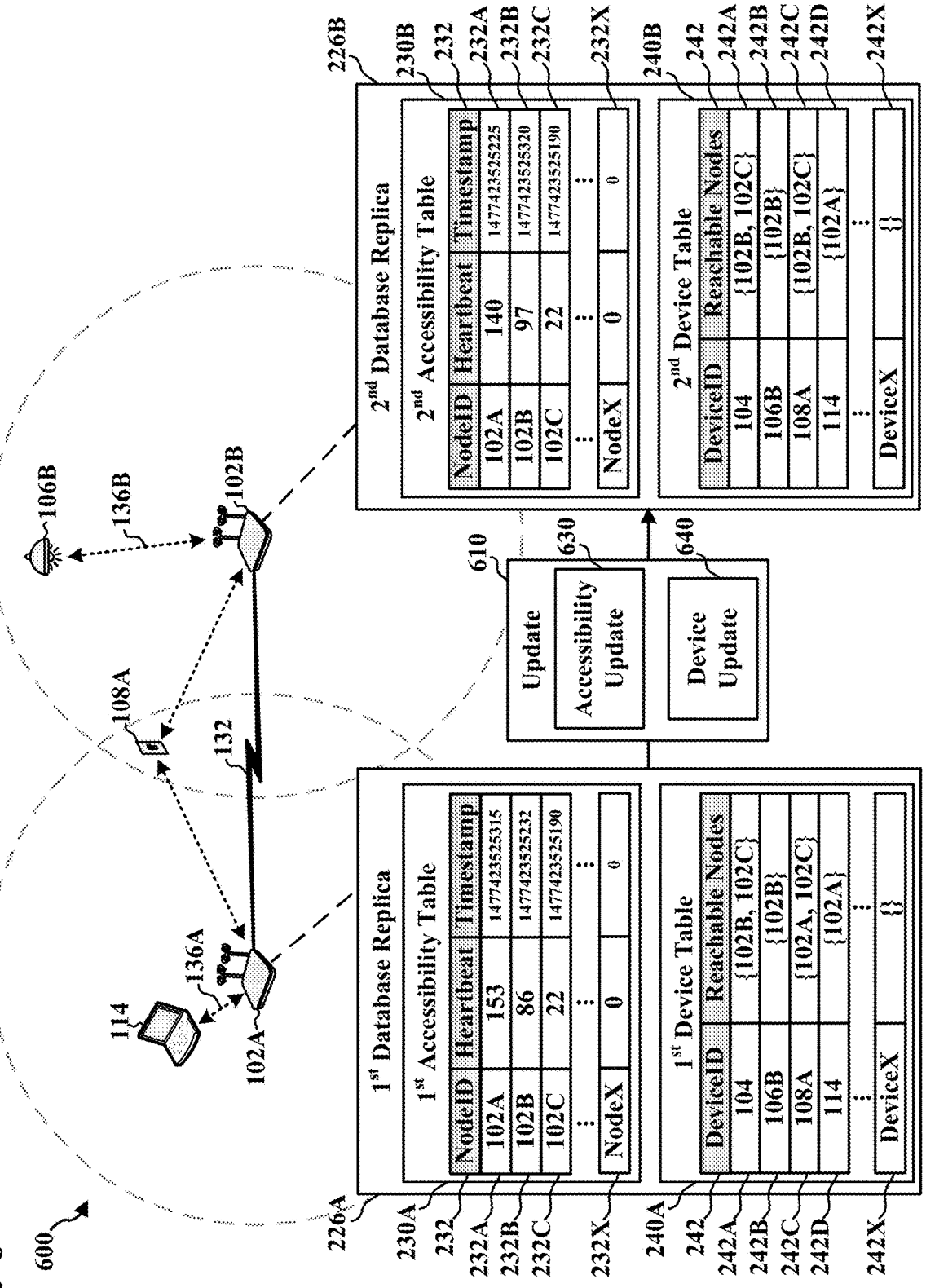
FIG. 6 is a diagram illustrating states of the distributed database at a first access node and at a second access node prior to applying an update from the first access node at the second access node.

FIG. 6 is a diagram illustrating states of the distributed database at a first access node 102A and at a second access node 102B prior to applying an update 610 from the first access node 102A at the second access node 102. In the example depicted in FIG. 6, the first access node 102A is connected to the second access node 102B using physical wire connection 132. Similar to FIG. 1, the devices (e.g., laptop 114, first light switch 108A, and second light fixture 106B) are connected using a wireless connection 134.

The first access node 102A includes a first database 226A with a first accessibility table 230A and a first device table 240A. The first accessibility table 230A includes three columns denoted by header 232 as nodeID corresponding to the node identifiers, heartbeat corresponding to the heart from the access node associate with the node identifiers, and timestamp corresponding to the instance when the entry (e.g., 232A, 232B, 232C, nodeX, etc.) were last locally updated. As depicted in FIG. 6, the first accessibility table 230A includes a first entry 232A for the first access node 102A with a heartbeat of 153 at timestamp "1477423525315," a second entry 232B for the second access node 102B with a heartbeat of 86 at timestamp "1477423525232," and a third entry 232C for the third access node 102C with a heartbeat of 22 at timestamp "1477423525190." It should be appreciated that additional nodes can be added to the first accessibility table 230A, which is designated by an $x^{th}$ entry 232X for nodeX initiated with a heartbeat of 0 and timestamp of 0 (e.g., initial values for an un-registered device).

The first device table 240A includes two columns denoted by header 242 as deviceID corresponding to the device registered with the network, and a set of node identifiers (e.g., nodeIDs) corresponding to a direct connection between the device and the node identifier. As depicted in FIG. 6, the first device table 240A includes a first entry 242A for the thermostat 104 with a direct connection to the second access node 102B and the third access node 102C (e.g., See FIG. 1), a second entry 242B for the second light fixture 106B with a direct connection to the second access node 102B (e.g., See FIG. 1), a third entry 242C for the first light switch 108A with a direct connection to the first access node 102A and the second access node 102B, a fourth entry for the laptop 114 with a direct connection to the second access node 102B. It should be appreciated that additional devices can be added to first device table 240A as designated by an $x^{th}$ entry 242X for device with an empty set (e.g., initial conditions for an unregistered device). Such devices include the first/third light fixture 106A/105C, first/third power outlet 110A/110C, light switch 108B, tablet PC 116, second/third access node 102B/102C, as depicted in FIG. 1. It should also be appreciated that an entry from first access node 102A can be "102A; {102A, 102B, 102C}" or "102A; {102B, 102C}" since it can be inferred that a device has direct connection with itself.

For the update 610, the first access node 102A copied the entries in the first accessibility table 230A into an accessibility update 630 and transmitted the accessibility update 630 to the second access node 102B. Likewise, the first access node 102A copied the entries in the first device table 240A into a device update 640 and transmitted the device update 640 to the second access node 102B. In some embodiments, the update 610 includes one or both the accessibility update 630 and the device update 640.

As depicted in FIG. 6, the second access node 102B includes a second database 226B with a second accessibility table 230B and a second device table 240B. The second accessibility table 230B includes three columns denoted by header 232 as nodeID corresponding to the node identifiers, heartbeat corresponding to the heart from the access node associate with the node identifiers, and timestamp corresponding to the instance when the entry (e.g., 232A, 232B, 232C, nodeX, etc.) were last locally updated. As depicted in FIG. 6, the second accessibility table 230B includes a node identifier for the second access node 102B with a heartbeat of 140 at timestamp "1477423525225," a node identifier for the second access node 102B with a heartbeat of 97 at timestamp "1477423525320," and a node identifier for the third access node 102C with a heartbeat of 22 at timestamp "1477423525190." It should be appreciated that additional nodes can be added to the second accessibility table 230B, which is designated by an $x^{th}$ entry 232X for nodeX initiated with a heartbeat of 0 and timestamp of 0 (e.g., initial values for an un-registered device).

The second device table 240B includes two columns denoted by header 242 as deviceID corresponding to the device registered with the network, and a set of node identifiers (e.g., nodeIDs) corresponding to a direct connection between the device and the node identifier. As depicted in FIG. 6, the second device table 240B includes a device identifier for the thermostat 104 with a direct connection to the second access node 102B and the third access node 102C (e.g., See FIG. 1), a device identifier for the second light fixture 106B with a direct connection to the second access node 102B (e.g., See FIG. 1), a device identifier for the first light switch 108A with a direct connection to the second access node 102B and the third access node 102C, and a device identifier for the laptop 114 with a direct connection to the second access node 102B. It should be appreciated that additional devices can be added to second device table 240B as designated by an $x^{th}$ entry 242X for device with an empty set (e.g., initial conditions for an unregistered device). Such devices include the first/third light fixture 106A/105C, first/third power outlet 110A/110C, light switch 108B, tablet PC 116, second/third access node 102B/102C, as depicted in FIG. 1. It should also be appreciated that an entry from second access node 102B can be "102A; {102A, 102B, 102C}" or "102B; {102A, 102C}" since it can be inferred that a device has direct connection with itself.

Figure 7:
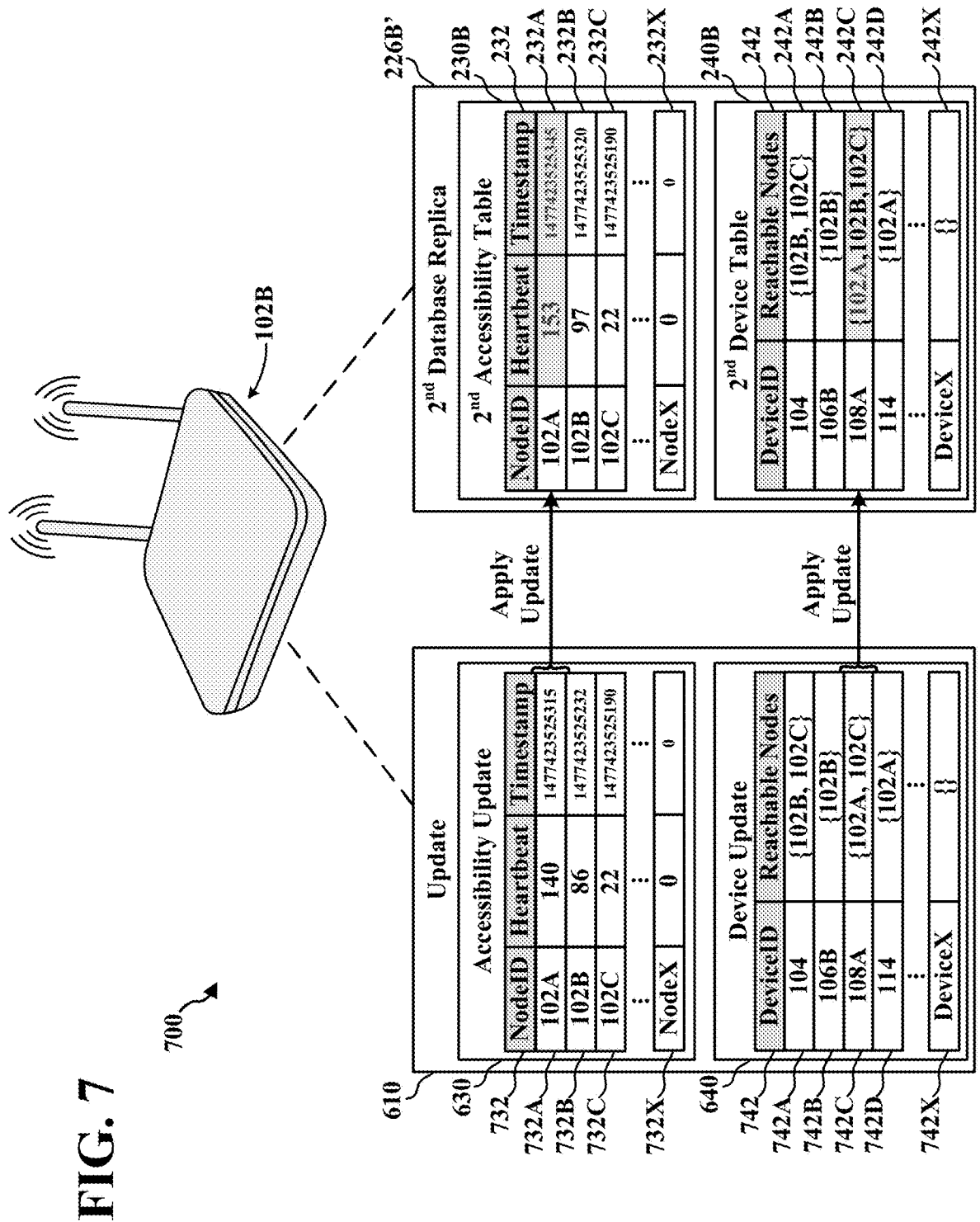
FIG. 7 is a diagram illustrating the application of an update (e.g., accessibility update and device update) to the second dataset replica at the second access node.

FIG. 7 is a diagram illustrating the application of an update 610 (e.g., accessibility update 630 and device update 640) to the second dataset replica 226' at the second access node 102B. The update 610 as described in FIG. 6 includes the accessibility update 630 and the device update 640. The accessibility update 630 is a copy of the first accessibility table 230A, which includes three columns denoted by header 232 as nodeID corresponding to the node identifiers, heartbeat corresponding to the heart from the access node associate with the node identifiers, and timestamp corresponding to the instance when the entry (e.g., 232A, 232B, 232C, nodeX, etc.) were last locally updated. As depicted in FIG. 7, the accessibility update 630 includes the first access node 102A with a heartbeat of 153 at timestamp "1477423525315," the second access node 102B with a heartbeat of 86 at timestamp "1477423525232," and the third access node 102C with a heartbeat of 22 at timestamp "1477423525190."

In comparing the entries to the accessibility update 630 to the second accessibility table 230B, the second access node 1028 will apply the update corresponding to the first entry 732A corresponding to the first access node 102A to the first entry 232A of the second accessibility table 230B. That is, the second access node 1028 replaces the heartbeat of 140 with 153 and the second success node 1028 replaces the timestamp of the first entry 232A with the instant timestamp of "1477423525345" from the local timestamp generator.

The device update 640 is a copy of the first device table 240A, which includes two columns denoted by header 242 as deviceID corresponding to the device registered with the network, and a set of node identifiers (e.g., nodeIDs) corresponding to a direct connection between the device and the node identifier. The first device table 240A includes the thermostat 104 with a direct connection to the second access node 102B and the third access node 102C (e.g., See FIG. 1), the second light fixture 106B with a direct connection to the second access node 102B (e.g., See FIG. 1), the first light switch 108A with a direct connection to the first access node 102A and the second access node 102B, and laptop 114 with a direct connection to the second access node 102B.

In comparing the entries in the device update 640 to the second device table 240B, the second access node 102B will apply the update corresponding to the third entry 742C corresponding to the first access node 102A to the third entry 232C of the second accessibility table 230B. That is, the second success node 102B determines that set of node identifiers (e.g., nodeID) for the first light switch 108A in the second device table 240B does not include the first access node 102A. As such, the second access node 102B adds the first access node to the set of node identifiers (e.g., nodeIDs) to the third entry 232C of the second device database 240B.

In some embodiments, having non-intersecting devices between the second device table 240B and the device update 640 triggers the second access node to transmits a "reply" update that includes an entry that is a copy of the updated third entry 242C of the second device table 240B, "108A; {102A, 102B, 102C}." In some instances the "reply" update includes updates to the second accessibility table 230B (e.g., the first entry 232A, "102A; 153; 1477423525345").

Figure 8:
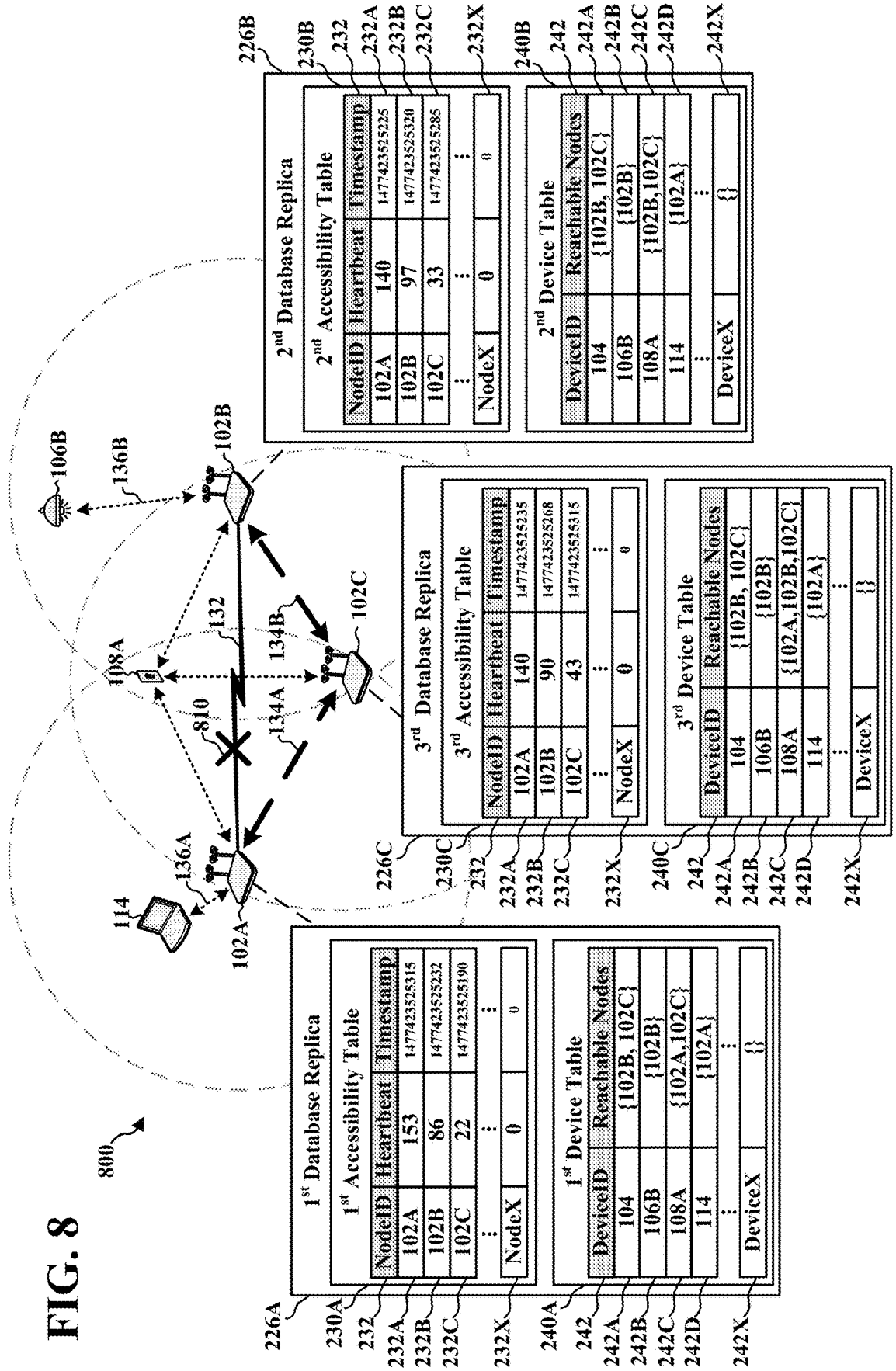
FIG. 8 is a diagram illustrating states of the replicas of the distributed database at the first access node, a second access node, and a first access node immediately after to a network connection between the first access node and the third access node is severed.

FIG. 8 is a diagram illustrating states of the replicas of the database at the first access node, a second access node, and a first access node immediately after to a network connection between the first access node and the third access node is severed (e.g., severed connection 810). In the example depicted in FIG. 8, the physical wired connection between the first access node 102A and the second access node 102B is severed (e.g., severed connection 810), while the wireless connection 134A between the first access node 102A and the wireless connection 134b between the third access node 102C and the third access node 102C and the second access node 102B is remains.

The first accessibility table 230A includes a first entry 232A for the first access node 102A with a heartbeat of 153 at timestamp "1477423525315," a second entry 232B for the second access node 102B with a heartbeat of 86 at timestamp "1477423525232," and a third entry 232C for the third access node 102C with a heartbeat of 22 at timestamp "1477423525190." It should be appreciated that additional nodes can be added to the first accessibility table 230A, which is designated by an $x^{th}$ entry 232X for nodeX initiated with a heartbeat of 0 and timestamp of 0 (e.g., initial values for an un-registered device).

The first device table 240A includes two columns denoted by header 242 as deviceID corresponding to the device registered with the network, and a set of node identifiers (e.g., nodeIDs) corresponding to a direct connection between the device and the node identifier. As depicted in FIG. 8, the first device table 240A includes a first entry 242A for the thermostat 104 with a direct connection to the second access node 102B and the third access node 102C (e.g., See FIG. 1), a second entry 242B for the second light fixture 106B with a direct connection to the second access node 102B (e.g., See FIG. 1), a third entry 242C for the first light switch 108A with a direct connection to the first access node 102A and the second access node 102B, a fourth entry for the laptop 114 with a direct connection to the second access node 102B. It should be appreciated that additional devices can be added to first device table 240A as designated by an $x^{th}$ entry 242X for device with an empty set (e.g., initial conditions for an unregistered device). Such device include the first/third light fixture 106A/105C, first/third power outlet 110A/110C, light switch 108B, tablet PC 116, second/third access node 102B/102C, as depicted in FIG. 1. It should also be appreciated that an entry from first access node 102A can be "102A; {102A, 102B, 102C}" or "102A; {102B, 102C}" since it can be inferred that a device has direct connection with itself.

The second access node 102B includes a second database 226B with a second accessibility table 230B and a second device table 240B. The second accessibility table 230B includes three columns denoted by header 232 as nodeID corresponding to the node identifiers, heartbeat corresponding to the heart from the access node associate with the node identifiers, and timestamp corresponding to the instance when the entry (e.g., 232A, 232B, 232C, nodeX, etc.) were last locally updated. The second accessibility table 230B includes a node identifier for the second access node 102B with a heartbeat of 140 at timestamp "1477423525225," a node identifier for the second access node 102B with a heartbeat of 97 at timestamp "1477423525320," and a node identifier for the third access node 102C with a heartbeat of 22 at timestamp "1477423525190." It should be appreciated that additional nodes can be added to the second accessibility table 230B, which is designated by an $x^{th}$ entry 232X for nodeX initiated with a heartbeat of 0 and timestamp of 0 (e.g., initial values for an un-registered device).

The second device table 240B includes two columns denoted by header 242 as deviceID corresponding to the device registered with the network, and a set of node identifiers (e.g., nodeIDs) corresponding to a direct connection between the device and the node identifier. The second device table 240B includes a device identifier for the thermostat 104 with a direct connection to the second access node 102B and the third access node 102C (e.g., See FIG. 1), a device identifier for the second light fixture 106B with a direct connection to the second access node 102B (e.g., See FIG. 1), a device identifier for the first light switch 108A with a direct connection to the second access node 102B and the third access node 102C, and a device identifier for the laptop 114 with a direct connection to the second access node 102B. It should be appreciated that additional devices can be added to second device table 240B as designated by an $x^{th}$ entry 242X for device with an empty set (e.g., initial conditions for an unregistered device). Such device include the first/third light fixture 106A/105C, first/third power outlet 110A/110C, light switch 108B, tablet PC 116, second/third access node 102B/102C, as depicted in FIG. 1. It should also be appreciated that an entry from second access node 102B can be "102B; {102A, 102B, 102C}" or "102B; {102A, 102C}" since it can be inferred that a device has direct connection with itself.

The third access node 102C includes a third database 226C with a third accessibility table 230C and a third device table 240C. The third accessibility table 230C includes three columns denoted by header 232 as nodeID corresponding to the node identifiers, heartbeat corresponding to the heart from the access node associate with the node identifiers, and timestamp corresponding to the instance when the entry (e.g., 232A, 232B, 232C, nodeX, etc.) were last locally updated. The third accessibility table 230C includes a node identifier for the first access node 102A with a heartbeat of 140 at timestamp "1477423525235," a node identifier for the second access node 102B with a heartbeat of 90 at timestamp "1477423525268," and a node identifier for the third access node 102C with a heartbeat of 43 at timestamp "1477423525315." It should be appreciated that additional nodes can be added to the third accessibility table 230C, which is designated by an $x^{th}$ entry 232X for nodeX initiated with a heartbeat of 0 and timestamp of 0 (e.g., initial values for an un-registered device).

The third device table 240C includes two columns denoted by header 242 as deviceID corresponding to the device registered with the network, and a set of node identifiers (e.g., nodeIDs) corresponding to a direct connection between the device and the node identifier. The third device table 240C includes a device identifier for the thermostat 104 with a direct connection to the second access node 102B and the third access node 102C (e.g., See FIG. 1), a device identifier for the second light fixture 106B with a direct connection to the second access node 102B (e.g., See FIG. 1), a device identifier for the first light switch 108A with a direct connection to the first access node 102A, the second access node 102B, and the third access node 102C, and a device identifier for the laptop 114 with a direct connection to the second access node 102B. It should be appreciated that additional devices can be added to third device table 240C as designated by an x$^{th}$ entry 242X for device with an empty set (e.g., initial conditions for an unregistered device). Such device include the first/third light fixture 106A/105C, first/third power outlet 110A/110C, light switch 108B, tablet PC 116, second/third access node 102B/102C, as depicted in FIG. 1. It should also be appreciated that an entry from third access node 102C can be "102C; {102A, 102B, 102C}" or "102C; {102A, 102B}" since it can be inferred that a device has direct connection with itself.

Figure 9:
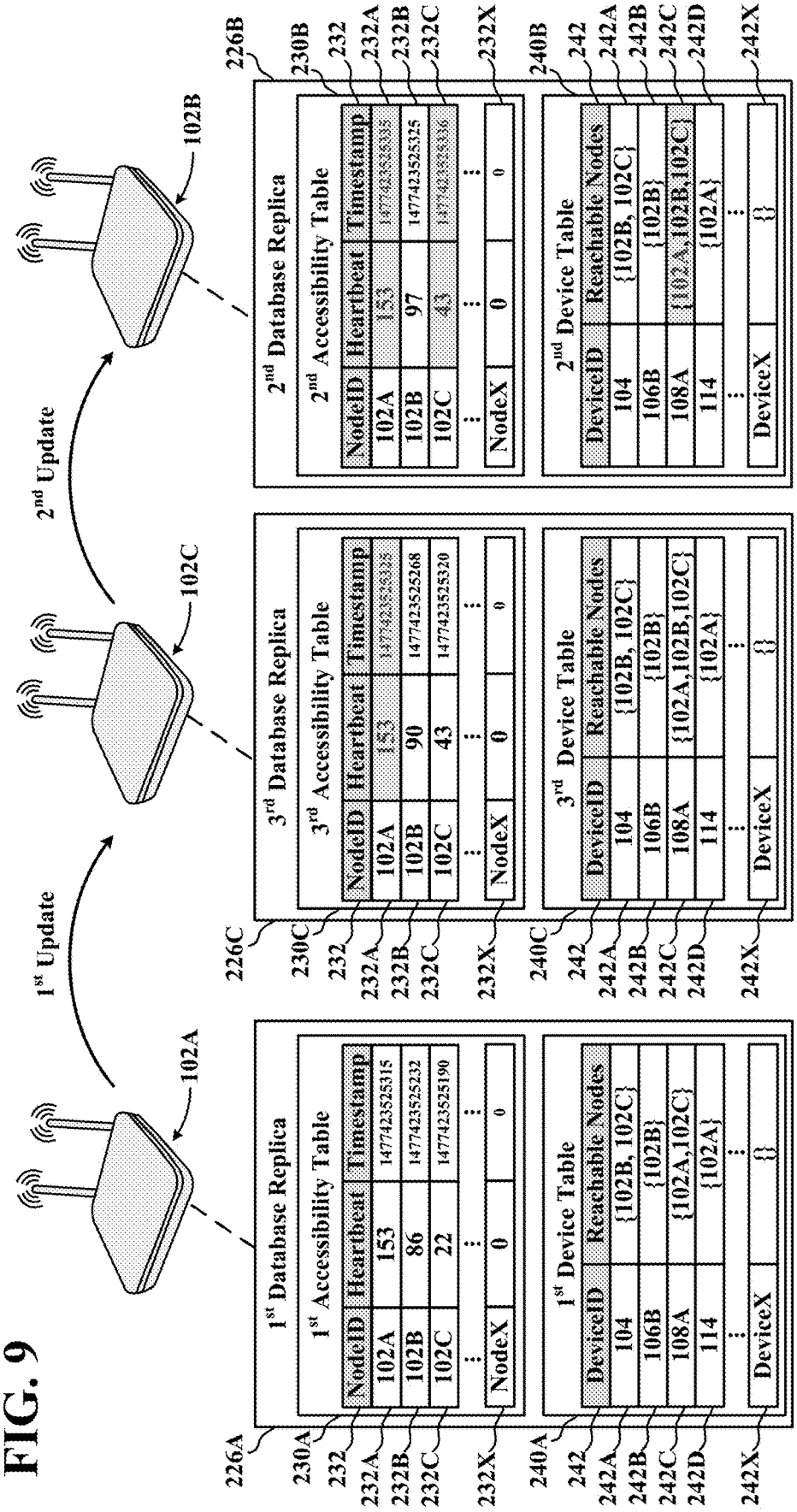
FIG. 9 is a diagram illustrating the states of the replicas of the database at the second access node and the third access node after an update.

FIG. 9 is a diagram illustrating the states of the replicas of the database at the second access node and the third access node after an update. In the examples depicted in FIG. 9, the database replicas converge even when one or more connections are disconnected. In this example, the direct connection between the first access node 102A and the second access node 102B is severed (e.g., severed connection 810). As such, the first access node 102A determines that an update to the second access node 102B is to be routed through the third access node 102C.

The first accessibility table 230A includes a first entry 232A for the first access node 102A with a heartbeat of 153 at timestamp "1477423525315," a second entry 232B for the second access node 102B with a heartbeat of 86 at timestamp "1477423525232," and a third entry 232C for the third access node 102C with a heartbeat of 22 at timestamp "1477423525190." It should be appreciated that additional nodes can be added to the first accessibility table 230A, which is designated by an x$^{th}$ entry 232X for nodeX initiated with a heartbeat of 0 and timestamp of 0 (e.g., initial values for an un-registered device).

The first device table 240A includes two columns denoted by header 242 as deviceID corresponding to the device registered with the network, and a set of node identifiers (e.g., nodeIDs) corresponding to a direct connection between the device and the node identifier. The first device table 240A includes a first entry 242A for the thermostat 104 with a direct connection to the second access node 102B and the third access node 102C (e.g., See FIG. 1), a second entry 242B for the second light fixture 106B with a direct connection to the second access node 102B (e.g., See FIG. 1), a third entry 242C for the first light switch 108A with a direct connection to the first access node 102A and the second access node 102B, a fourth entry for the laptop 114 with a direct connection to the second access node 102B. It should be appreciated that additional devices can be added to first device table 240A as designated by an x$^{th}$ entry 242X for device with an empty set (e.g., initial conditions for an unregistered device). Such device include the first/third light fixture 106A/105C, first/third power outlet 110A/110C, light switch 108B, tablet PC 116, second/third access node 102B/102C, as depicted in FIG. 1. It should also be appreciated that an entry from first access node 102A can be "102A; {102A, 102B, 102C}" or "102A; {102B, 102C}" since it can be inferred that a device has direct connection with itself. The first access node 102A transmits an update (e.g., first update) to the third access node 102C.

Once the update from the first access node 102A (e.g., the first update) is received and applied, the third access node 102C updates the third database 226C. In comparing the entries to the accessibility update (e.g., in the first update) to the third accessibility table 230C, the third access node 102C updates the heartbeat to 153 for the first entry 232A of the third accessibility table 230C and applies a current timestamp of "1477423525325" from the local timestamp generator. The remaining entries for the third accessibility table 230C remain unchanged (e.g., second entry 232B, third entry 232C, etc.). In comparing the entries to the device update (e.g., in the first update) to the third device table 240C, the third access node 102C determines that the third device table is up-to-date. As such, the third access node 102C does not update any of the entries in the third device table 240C (e.g., entries in first entry 242A, the second entry 242B, the third entry 242C, fourth entry 242D, etc. remain unchanged).

As this update is directed to the second access node 102B, the update includes information that triggers the third access node 102C to transmit a second update to the second access node 102B. Once the update from the third access node 102C (e.g., the second update) is received and applied, the second access node 102B updates the second database 226B. In comparing the entries to the accessibility update (e.g., in the second update) to the second accessibility table 230B, the second access node 102B updates the heartbeat to 153 for the first entry 232A of the second accessibility table 230B and applies a current timestamp of "1477423525335" from the local timestamp generator. Subsequently, the second access node 102B updates the heartbeat to 43 for the third entry 232C of the second accessibility table 230B and applies a current timestamp of "1477423525336" from the local timestamp generator. The remaining entries for the second accessibility table 230B remain unchanged (e.g., the second entry 232B, etc.). In comparing the entries to the device update (e.g., in the second update) to the second device table 240B, the second access node 102B updates the set of node identifiers for the first light switch 108A to include a node identifier for the first access node 102A. As such, the third entry of the second device table 240B corresponding to the first light switch 108A becomes "108A:{ 102A, 102B, 102C}."

Figure 10:
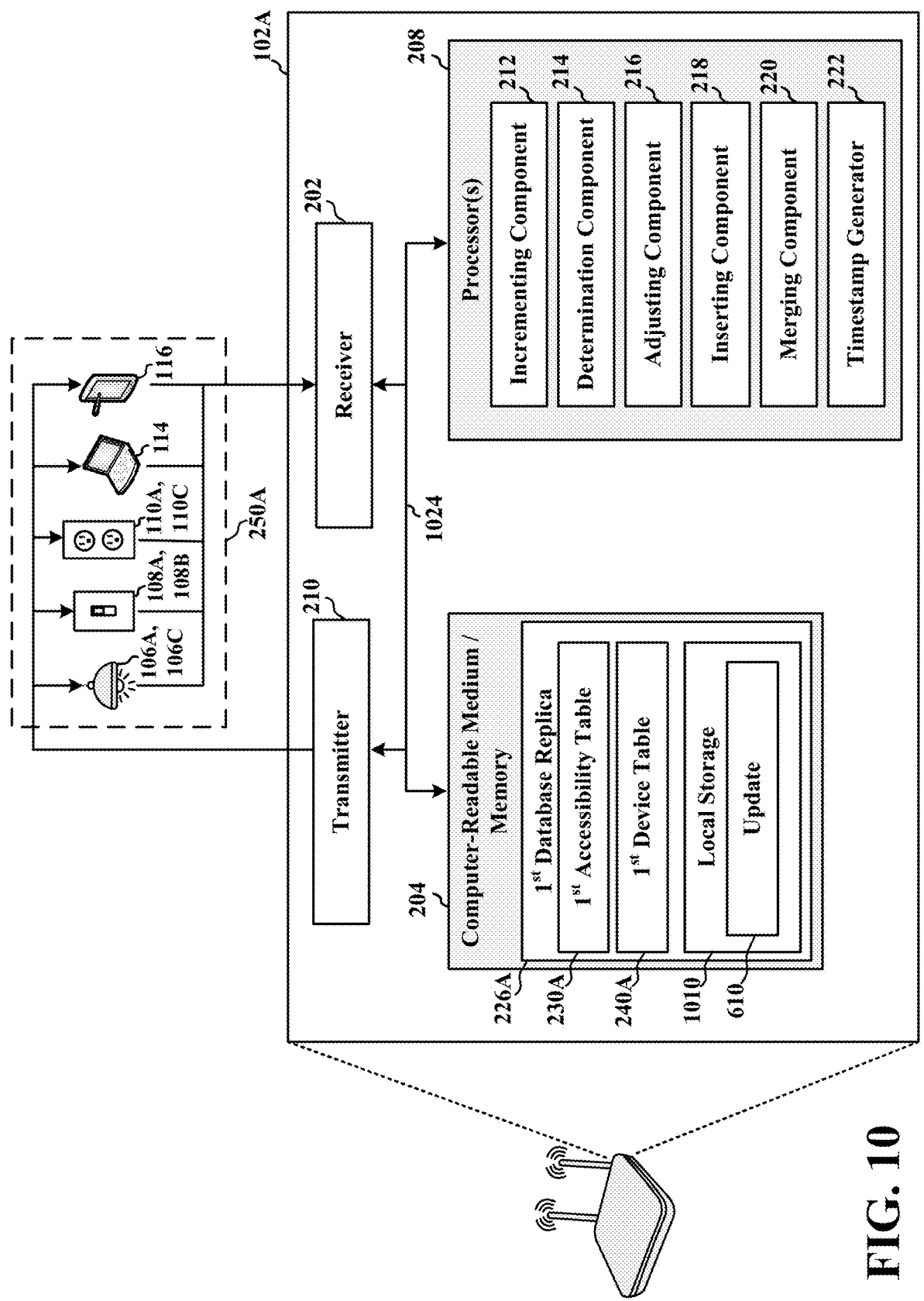
FIG. 10 is a diagram illustrating an example of a hardware implementation for an access node with a replica of the database.

FIG. 10 is a diagram illustrating an example of a hardware implementation for an access node with a replica of the database. The access node, represented by the first access node 102A, can be implanted with bus architecture, which is represented generally by the bus 1024. The bus 1024 can include any number of interconnecting buses and bridges depending on the specific application of the first access node and the overall design constraints. The bus 1024 links together various circuits including one or more processors and/or hardware components, represented by the processor 208, the incrementing component 212, determination component 214, adjusting component 216, inserting component 218, merging component 220, time stamp generator 222, and the computer-readable medium/memory 204. The bus 1024 can also link various other circuits such as timing sources, peripherals, voltage regulators, and power management circuits, which are well known in the art.

The first access node 102A is electrically coupled to a transmitter 210. The transmitter 210 is electrically coupled to one or more antennas and/or transmission lines. The transmitter 210 provides a means for transmitting communication with various other access node and/or devices over a transmission medium. The transmitter 210 transmits a signal to the one or more antennas and/or transmission lines, which is received by one or more electronic devices over a network. The transmitted signal can include requests for the one or more electronic devices or updates for access nodes. The updates can be accessibility updates or device updates. In addition, the transmitter 210 can receive information from the first access node, specifically the first database replica 226A, and based on the received information, generates a signal to be applied to the one or more antennas and/or transmission lines.

The first access node 102A is electrically coupled to a receiver 202. The receiver 202 is electrically coupled to the one or more antennas and/or transmission lines. The receiver 202 provides a means for receiving communication with various other access node and/or devices over a transmission medium. The receiver 202 receives a signal from the one or more antennas and/or transmission lines, which is transmitted by the one or more electronic devices over the network. The received signal can include requests for the one or more electronic devices or updates (e.g., accessibility updates or device updates) for access nodes. The receiver 202 can extract information from the received signal, and provide the extracted information to the first access node 102A.

The first access node 102A includes a processor 208 coupled to a computer-readable medium/memory 204. The processor 208 is responsible for general processing, including the execution of software stored on the computer-readable medium/memory 204. The software, when executed by the processor 204, causes the first access node 102A to perform the various functions described supra for any particular apparatus (e.g., access node or networked device). The computer-readable medium/memory 204 includes local storage 1010 and can also be used for storing data that is manipulated by the processor 208 when executing software. For example, the update 610 can be stored in the local storage 1010. The computer-readable medium/memory 204 can include the first database replica 230A, which distributed across one or more access nodes in the network. The first database replica 230A includes both a first accessibility table 230A, which maintains the heartbeat and timestamps for each access node in the network and the first device table, which maintains the access nodes that are directly connected to the networked devices.

The first access node 102A further includes at least one of the incrementing component 212, the determination component 214, the adjusting component 216, the inserting component 218, the merging component 220, or the time stamp generator 222. The components can be software components running in the processor 208, resident/stored in the computer readable medium/memory 204, one or more hardware components coupled to the processor 208, or some combination thereof.

In one configuration, the first access node 102A for synchronizing accessibility of a plurality of access nodes includes means for determining receiving an accessibility update from a remote node. The accessibility update includes a heartbeat for each node identifier. The first access node 102A includes means for determining whether a node identifier from the accessibility update matches at least one node identifier from an accessibility database, which is local to the first access node 102A. The first access node 102A includes means for determining whether a heartbeat associated with the node identifier from the accessibility update is greater than a heartbeat associated with the at least one node identifier from the accessibility database in accordance with a determination that the node identifier from the accessibility update matches the at least one node identifier from the accessibility database. The first access node 102A includes means for adjusting the heartbeat associated with the node identifier from the accessibility database in accordance with the determination that the heartbeat associated with the node identifier from the accessibility update is greater than the heartbeat associated with the node identifier from the accessibility database.

In such a configuration, the means for adjusting the heartbeat associated with the node identifier from the accessibility database is further configured to replace the heartbeat associated with the node identifier from the accessibility database with the heartbeat associated with the node identifier from the accessibility update.

In such a configuration, the means for adjusting the heartbeat associated with the node identifier from the accessibility database is further configured to generate a local timestamp corresponding to inserting the node identifier and the heartbeat associated with the node identifier from the accessibility update into the accessibility database and configured to insert the local timestamp into the accessibility database to reflect the adjustment of the heartbeat associated with the node identifier.

In one configuration, the first access node 102A further includes means for inserting the node identifier and the heartbeat associated with the node identifier from the accessibility update into the accessibility database in accordance with a determination that the node identifier from the accessibility update does not match the at least one node identifier from the accessibility database.

In accordance with the determination that the heartbeat associated with the node identifier from the accessibility update is less than the heartbeat associated with the node identifier from the accessibility database, in one configuration, the first access node 102A further includes means for inserting the at least one node identifier and heartbeat from the accessibility database into a second accessibility update and means for transmitting the second accessibility update to the remote node.

In accordance with the determination that the heartbeat associated with the node identifier from the accessibility update is equal to the heartbeat associated with the node identifier from the accessibility database, in one configuration, the first access node 102A further includes means for determining whether a time difference from a last action associated with the node identifier exceeds a threshold value and means for inserting an inaccessibility indicator associated with the node identifier from the accessibility database.

In one configuration, the first access node 102A further includes means for determining whether an inaccessibility indicator is associated with the node identifier from the accessibility database. The first access node 102A includes means for removing the inaccessibility indicator in accordance with the determination that the inaccessibility indicator is associated with the node identifier from the accessibility database. The first access node 102A includes means for calculating an elapsed time of inaccessibility of an access node associated with the node identifier from the accessibility database. The first access node 102A includes means for storing the elapsed time of inaccessibility to a temporal database (e.g., duration of inaccessibility database). Such a configuration further includes means for weighting a threshold value based on an aggregation of elapsed time from the temporal database. The threshold value indicates an amount of time an access node can be idle before the access node is considered inaccessible.

In one configuration, the first access node 102A includes means for receiving a device update from the remote access node. The device update includes a set of node identifiers for each device identifier. The first access node 102A includes means for receiving a device update from the remote access node. The device update includes a set of node identifiers for each device identifier. The first access node 102A includes means for determining whether the device identifier from the device update matches at least one device identifier from a device database, which is local to the access node. In accordance with a determination that the device identifier from the device update matches the at least one device identifier from a device database, the first access node 102A includes means for determining whether the set of node identifiers associated with the device identifier from the device update has non-intersecting devices to a set of node identifiers associated with the at least one device identifier from a device database and means for merging the set of node identifiers associated with the device identifier from the device update into the set of node identifiers associated with the at least one device identifier from a device database.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any example described herein as "exemplary" is not necessarily to be construed as preferred or advantageous over other examples. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various examples described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed under 35 U.S.C § 112(f) unless the element is expressly recited using the phrase "means for."

What is claimed is:

1. A method for synchronizing accessibility of a plurality of access nodes, the method comprising:
receiving, at an access node, an accessibility update from a remote node, wherein the accessibility update comprises one or more heartbeats for one or more node identifiers;
determining whether a node identifier from the accessibility update matches at least one node identifier from an accessibility database, wherein the accessibility database is local to the access node;
determining whether the remote node is ranked via a particular degree of accessibility;
in accordance with a determination that the node identifier from the accessibility update matches the at least one node identifier from the accessibility database, determining whether a heartbeat associated with the node identifier from the accessibility update is greater than a heartbeat associated with the at least one node identifier from the accessibility database; and
in accordance with the determination that the heartbeat associated with the node identifier from the accessibility update is greater than the heartbeat associated with the node identifier from the accessibility database and that the remote node is ranked via the particular degree of accessibility, adjusting the heartbeat associated with the node identifier from the accessibility database via replacing the heartbeat associated with the node identifier from the accessibility database with the heartbeat associated with the node identifier from the accessibility update.

2. The method of claim 1, further comprising:
in accordance with a determination that the node identifier from the accessibility update does not match the at least one node identifier from the accessibility database, inserting the node identifier and the heartbeat associated with the node identifier from the accessibility update into the accessibility database.

3. The method of claim 1, wherein adjusting the heartbeat associated with the node identifier from the accessibility database further comprises:
generating a local timestamp corresponding to inserting the node identifier and the heartbeat associated with the node identifier from the accessibility update into the accessibility database; and
inserting the local timestamp into the accessibility database to reflect the adjustment of the heartbeat associated with the node identifier.

4. The method of claim 1, further comprising:
in accordance with the determination that the heartbeat associated with the node identifier from the accessibility update is less than the heartbeat associated with the node identifier from the accessibility database:
inserting the at least one node identifier and the heartbeat from the accessibility database into a second accessibility update; and
transmitting the second accessibility update to the remote node.

5. The method of claim 1, further comprising:
in accordance with the determination that the heartbeat associated with the node identifier from the accessibility update is equal to the heartbeat associated with the node identifier from the accessibility database:
determining whether a time difference from a last action associated with the node identifier exceeds a threshold value; and
inserting an inaccessibility indicator associated with the node identifier from the accessibility database.

6. The method of claim 1, further comprising:

determining whether an inaccessibility indicator is associated with the node identifier from the accessibility database;

removing the inaccessibility indicator in accordance with the determination that the inaccessibility indicator is associated with the node identifier from the accessibility database;

calculating an elapsed time of inaccessibility of an access node associated with the node identifier from the accessibility database; and storing the elapsed time of inaccessibility to a temporal database.

7. The method of claim 6, further comprising weighting a threshold value based on an aggregation of elapsed time from the temporal database, wherein the threshold value indicates an amount of time the access node can be idle before the access node is considered inaccessible.

8. The method of claim 1, further comprising:
receiving a device update from the remote node, wherein the device update comprises a set of node identifiers for one or more device identifiers;
determining whether a device identifier from the device update matches at least one device identifier from a device database, wherein the device database is local to the access node;
in accordance with a determination that the device identifier from the device update matches the at least one device identifier from the device database:
determining whether the set of node identifiers associated with the device identifier from the device update has non-intersecting devices to a set of node identifiers associated with the at least one device identifier from the device database; and
merging the set of node identifiers associated with the device identifier from the device update into the set of node identifiers associated with the at least one device identifier from the device database.

9. A non-transitory computer-readable storage medium comprising one or more programs for execution by one or more processors of an access node, the one or more programs including instructions to:
receive an accessibility update from a remote node, wherein the accessibility update comprises one or more heartbeats for one or more node identifiers;
determine whether a node identifier from the accessibility update matches at least one node identifier from an accessibility database, wherein the accessibility database is local to the access node;
determine whether the remote node is ranked via a particular degree of accessibility;
in accordance with a determination that the node identifier from the accessibility update matches the at least one node identifier from the accessibility database, determine whether a heartbeat associated with the node identifier from the accessibility update is greater than a heartbeat associated with the at least one node identifier from the accessibility database; and
in accordance with the determination that the heartbeat associated with the node identifier from the accessibility update is greater than the heartbeat associated with the node identifier from the accessibility database and that the remote node is ranked via the particular degree of accessibility, adjust the heartbeat associated with the node identifier from the accessibility database via a replacement of the heartbeat associated with the node identifier from the accessibility database with the heartbeat associated with the node identifier from the accessibility update.

10. The non-transitory computer-readable storage medium of claim 9, wherein the instructions to adjust the heartbeat associated with the node identifier from the accessibility database further comprises instructions to:
generate a local timestamp corresponding to inserting the node identifier and the heartbeat associated with the node identifier from the accessibility update into the accessibility database; and
insert the local timestamp into the accessibility database to reflect the adjustment of the heartbeat associated with the node identifier.

11. The non-transitory computer-readable storage medium of claim 9, wherein in accordance with the determination that the heartbeat associated with the node identifier from the accessibility update is less than the heartbeat associated with the node identifier from the accessibility database, the one or more programs include instructions to:
insert the at least one node identifier and heartbeat from the accessibility database into a second accessibility update; and
transmit the second accessibility update to the remote node.

12. The non-transitory computer-readable storage medium of claim 9, wherein in accordance with the determination that the heartbeat associated with the node identifier from the accessibility update is equal to the heartbeat associated with the node identifier from the accessibility database, the one or more programs include instructions to:
determine whether a time difference from a last action associated with the node identifier exceeds a threshold value; and
insert an inaccessibility indicator associated with the node identifier from the accessibility database.

13. The non-transitory computer-readable storage medium of claim 9, wherein the one or more programs include instructions to:
determine whether an inaccessibility indicator is associated with the node identifier from the accessibility database;
remove the inaccessibility indicator in accordance with the determination that the inaccessibility indicator is associated with the node identifier from the accessibility database;
calculate an elapsed time of inaccessibility of an access node associated with the node identifier from the accessibility database; and
store the elapsed time of inaccessibility to a temporal.

14. The non-transitory computer-readable storage medium of claim 13, wherein the one or more programs include instructions to heuristically weight a threshold value based on an aggregation of elapsed time from the temporal database, wherein the heuristically weighted threshold value corresponds to an amount of time the access node can be idle before the access node is considered inaccessible.

15. The non-transitory computer-readable storage medium of claim 9, wherein the one or more programs include instructions to:
receive a device update from the remote node, wherein the device update comprises a set of node identifiers for one or more device identifiers;
determine whether a device identifier from the device update matches at least one device identifier from a device database, wherein the device database is local to the access node;

in accordance with a determination that the device identifier from the device update matches the at least one device identifier from the device database:
  determine whether the set of node identifiers associated with the device identifier from the device update has non-intersecting devices to a set of node identifiers associated with the at least one device identifier from the device database; and
  merge the set of node identifiers associated with the device identifier from the device update into the set of node identifiers associated with the at least one device identifier from the device database.

16. An electronic apparatus configured to synchronize accessibility of a plurality of access nodes at an access node, comprising:
  one or more processors;
  a memory coupled to the one or more processors; and
  one or more programs stored in memory, the one or more programs including instructions executable by the one or more processors to:
    receive an accessibility update from a remote node, wherein the accessibility update comprises one or more heartbeats for one or more node identifiers;
    determine whether a node identifier from the accessibility update matches at least one node identifier from an accessibility database, wherein the accessibility database is local to the access node;
    determine whether the remote node is ranked via a particular degree of accessibility;
    in accordance with a determination that the node identifier from the accessibility update matches the at least one node identifier from the accessibility database, determine whether a heartbeat associated with the node identifier from the accessibility update is greater than a heartbeat associated with the at least one node identifier from the accessibility database; and
    in accordance with the determination that the heartbeat associated with the node identifier from the accessibility update is greater than the heartbeat associated with the node identifier from the accessibility database and that the remote node is ranked via the particular degree of accessibility, adjust the heartbeat associated with the node identifier from the accessibility database via a replacement of the heartbeat associated with the node identifier from the accessibility database with the heartbeat associated with the node identifier from the accessibility update.

17. The electronic apparatus of claim 16, wherein the one or more programs further include instructions to:
  generate a local timestamp corresponding to inserting the node identifier and the heartbeat associated with the node identifier from the accessibility update into the accessibility database; and
  insert the local timestamp into the accessibility database to reflect the adjustment of the heartbeat associated with the node identifier.

18. The electronic apparatus of claim 16, wherein in accordance with the determination that the heartbeat associated with the node identifier from the accessibility update is less than the heartbeat associated with the node identifier from the accessibility database, the one or more programs further include instructions to:
  insert the at least one node identifier and the heartbeat from the accessibility database into a second accessibility update; and
  initiate transmission of the second accessibility update to the remote node.

19. The electronic apparatus of claim 16, wherein in accordance with the determination that the heartbeat associated with the node identifier from the accessibility update is equal to the heartbeat associated with the node identifier from the accessibility database, the one or more programs further include instructions to:
  determine whether a time difference from a last action associated with the node identifier exceeds a threshold value; and
  insert an inaccessibility indicator associated with the node identifier from the accessibility database.

20. The electronic apparatus of claim 16, wherein the one or more programs further include instructions to:
  determine whether an inaccessibility indicator is associated with the node identifier from the accessibility database;
  remove the inaccessibility indicator in accordance with the determination that the inaccessibility indicator is associated with the node identifier from the accessibility database;
  calculate an elapsed time of inaccessibility of an access node associated with the node identifier from the accessibility database; and
  store the elapsed time of inaccessibility to a temporal.

21. The electronic apparatus of claim 20, wherein the one or more programs further include instructions to heuristically weigh a threshold value based on an aggregation of elapsed time from the temporal database, wherein the heuristically weighted threshold value corresponds to an amount of time the access node can be idle before the access node is considered inaccessible.

22. The electronic apparatus of claim 16, wherein the one or more programs further include instructions to:
  receive a device update from the remote node, wherein the device update comprises a set of node identifiers for one or more device identifiers;
  determine whether a device identifier from the device update matches at least one device identifier from a device database, wherein the device database is local to the access node;
  in accordance with a determination that the device identifier from the device update matches the at least one device identifier from the device database:
    determine whether the set of node identifiers associated with the device identifier from the device update has non-intersecting devices to a set of node identifiers associated with the at least one device identifier from the device database; and
    merge the set of node identifiers associated with the device identifier from the device update into the set of node identifiers associated with the at least one device identifier from the device database.

* * * * *